(12) United States Patent
Ippolito et al.

(10) Patent No.: US 8,761,948 B1
(45) Date of Patent: Jun. 24, 2014

(54) SYSTEM AND METHOD FOR MANAGING AND MONITORING RENEWABLE ENERGY POWER GENERATION

(75) Inventors: David Ippolito, Glen Mills, PA (US); David Kucharczuk, Chadds Ford, PA (US)

(73) Assignee: Versify Solutions, Inc., Chadds Ford, PA (US)

( * ) Notice: Subject to any disclaimer, the term of this patent is extended or adjusted under 35 U.S.C. 154(b) by 1118 days.

(21) Appl. No.: 12/430,515

(22) Filed: Apr. 27, 2009

Related U.S. Application Data

(60) Provisional application No. 61/048,065, filed on Apr. 25, 2008.

(51) Int. Cl.
*G05D 11/00* (2006.01)

(52) U.S. Cl.
USPC ......... 700/286; 710/37; 318/400.19; 174/364

(58) Field of Classification Search
USPC ......... 700/286; 710/37; 318/400.19; 174/364
See application file for complete search history.

(56) References Cited

U.S. PATENT DOCUMENTS

| | | | |
|---|---|---|---|
| 5,964,879 A | 10/1999 | Dunstan et al. | |
| 6,021,402 A | 2/2000 | Takriti | |
| 6,473,744 B1 | 10/2002 | Tuck et al. | |
| 6,633,823 B2 | 10/2003 | Bartone et al. | |
| 6,925,385 B2 | 8/2005 | Ghosh et al. | |
| 7,020,701 B1 | 3/2006 | Gelvin et al. | |
| 7,142,949 B2 | 11/2006 | Brewster et al. | |
| 7,162,444 B1 | 1/2007 | Machado et al. | |
| 7,233,843 B2 | 6/2007 | Budhraja et al. | |
| 7,246,156 B2 | 7/2007 | Ginter et al. | |
| 7,274,975 B2 | 9/2007 | Miller | |
| 7,305,281 B2 | 12/2007 | Scott et al. | |
| 7,333,880 B2 | 2/2008 | Brewster | |
| 7,398,194 B2 | 7/2008 | Evans et al. | |
| 7,565,227 B2 | 7/2009 | Richard et al. | |
| 7,612,466 B2 | 11/2009 | Skutt | |
| 7,747,739 B2 | 6/2010 | Bridges et al. | |
| 7,752,106 B1 | 7/2010 | Corby et al. | |
| 7,840,607 B2 | 11/2010 | Henigman et al. | |
| 7,844,370 B2 | 11/2010 | Pollack et al. | |
| 7,844,439 B2 | 11/2010 | Nasle et al. | |
| 7,873,441 B2 | 1/2011 | Synesiou et al. | |
| 7,873,442 B2 | 1/2011 | Tsui | |

(Continued)

OTHER PUBLICATIONS

Li, Guang, "Day-Ahead Electricity Price Forecasting in a Grid Environment," IEEE Transactions on Power Systems, vol. 22, No. 1, Feb. 2007.

(Continued)

*Primary Examiner* — Mohammad Ali
*Assistant Examiner* — Sheela S Rao
(74) *Attorney, Agent, or Firm* — Morgan, Lewis & Bockius LLP

(57) ABSTRACT

The invention broadly encompasses a system including a communications network, a plurality of remotely located data sources to provide power data, the power data including quantitative and qualitative data of one or more renewable energy power generation units, and a performance monitor in communication with the plurality of remotely located data sources through the communications network, the performance monitor including a data store to store the power data, and a power manager to manage generation of power from the one or more renewable energy power generation units.

26 Claims, 35 Drawing Sheets

(56) References Cited

U.S. PATENT DOCUMENTS

| | | |
|---|---|---|
| 7,877,235 B2 | 1/2011 | McConnell et al. |
| 7,885,917 B2 | 2/2011 | Kuhns et al. |
| 7,925,552 B2* | 4/2011 | Tarbell et al. ............... 705/30 |
| 7,930,070 B2 | 4/2011 | Imes |
| 8,019,697 B2 | 9/2011 | Ozog |
| 8,068,938 B2 | 11/2011 | Fujita |
| 8,200,370 B2 | 6/2012 | Paik |
| 8,532,836 B2 | 9/2013 | Schmid et al. |
| 2002/0123974 A1 | 9/2002 | Kurokawa et al. |
| 2002/0147670 A1 | 10/2002 | Lange |
| 2003/0055776 A1 | 3/2003 | Samuelson |
| 2003/0163224 A1 | 8/2003 | Klaar et al. |
| 2003/0182250 A1 | 9/2003 | Shihidehpour et al. |
| 2004/0024483 A1 | 2/2004 | Holcombe |
| 2005/0004858 A1 | 1/2005 | Foster et al. |
| 2005/0027636 A1 | 2/2005 | Gilbert et al. |
| 2005/0125104 A1 | 6/2005 | Wilson et al. |
| 2005/0165511 A1 | 7/2005 | Fairlie |
| 2005/0171704 A1* | 8/2005 | Lewis et al. ............... 702/33 |
| 2005/0197742 A1 | 9/2005 | Scott et al. |
| 2005/0234600 A1 | 10/2005 | Boucher et al. |
| 2006/0047369 A1 | 3/2006 | Brewster et al. |
| 2006/0155423 A1 | 7/2006 | Budike |
| 2006/0259199 A1 | 11/2006 | Gjerde et al. |
| 2007/0124026 A1 | 5/2007 | Troxell et al. |
| 2007/0220907 A1 | 9/2007 | Ehlers |
| 2007/0271173 A1 | 11/2007 | Johnson et al. |
| 2008/0049013 A1 | 2/2008 | Nasle |
| 2008/0091580 A1 | 4/2008 | Kremen |
| 2008/0167756 A1 | 7/2008 | Golden et al. |
| 2008/0177678 A1 | 7/2008 | Di Martini et al. |
| 2009/0083167 A1 | 3/2009 | Subbloie |
| 2009/0088991 A1* | 4/2009 | Brzezowski et al. ............... 702/62 |
| 2009/0187284 A1 | 7/2009 | Kreiss et al. |
| 2009/0187499 A1 | 7/2009 | Mulder et al. |
| 2009/0281674 A1 | 11/2009 | Taft |
| 2010/0064001 A1 | 3/2010 | Daily |
| 2010/0076835 A1 | 3/2010 | Silverman |
| 2010/0145532 A1* | 6/2010 | Gregory et al. ............... 700/286 |
| 2010/0179862 A1 | 7/2010 | Chassin et al. |
| 2010/0250590 A1 | 9/2010 | Galvin |
| 2011/0060476 A1 | 3/2011 | Iino et al. |
| 2011/0202192 A1 | 8/2011 | Kempton |
| 2011/0282511 A1 | 11/2011 | Unetich |
| 2012/0065805 A1 | 3/2012 | Montalvo |
| 2012/0271686 A1 | 10/2012 | Silverman |

OTHER PUBLICATIONS

Feng, Xiaoming et al., "A new breed of software tool for integrated electrical power system and market analysis-GridView," Power Engineering Society Summer Meeting, 2002 IEEE, vol. 2, 25-25, pp. 737-743, Jul. 2002.

Wang, Hui-Fung Francis, "Power Systems Locational Marginal Pricing in Deregulated Markets," A dissertation, Tulane University, 2003.

Yang, Jian, "A market monitoring system for the open electricity markets," Power Engineering Society Summer Meeting, IEEE, vol. 1, pp. 235-240, 2001.

Hong, Ying-Yi, et al., "A neuro-fuzzy price forecasting approach in deregulated electricity markets," Electrical Power Systems Research, vol. 73, pp. 151-157, 2005.

Henderson, M. et al., "Planning for reliability, economics, and the environment in a deregulated market," Power and Energy Society General Meeting—Conversion and Delivery of Electrical Energy in the 21st Century, 2008 IEEE, pp. 1-9, Jul. 20-24, 2008.

USPTO—U.S. Appl. No. 13/556,535—Non-Final Office Action—Issued on Feb. 22, 2013.

USPTO—U.S. Appl. No. 12/399,689—Non-Final Office Action—Issued on May 22, 2013.

USPTO—U.S. Appl. No. 12/437,388—Final Office Action—Issued on Jun. 13, 2013.

USPTO Office Action dated Apr. 23, 2014 in related technology U.S. Appl. No. 13/556,535.

USPTO Office Action dated Feb. 14, 2014 in related technology U.S. Appl. No. 12/399,689.

* cited by examiner

Home • Portfolio  Unit  Wind  Event Log  • Real Time Monitor  PI/Events  Dashboards  Unit Performance  CPS • Forecast  Outages • Unit Attributes  Cont Region:   Control Area:   Station:   From:

Schedule Summary   Wind Availability

200

Click Cell to edit; Double-click to drill down...

| HE | Wind Forecast | Total Schedule | Total Wind | Wind 1 | Wind 2 | Wind 3 | Wind 4 | MW In AGC | MW Remaining |
|---|---|---|---|---|---|---|---|---|---|
| D100 | 12 MPH W | 0 | 0 | 200 | 200 | 200 | 200 | | 0 |
| D200 | 12 MPH W | 0 | 0 | 200 | 200 | 200 | 200 | | 0 |
| D300 | 12 MPH W | 0 | 0 | 200 | 200 | 200 | 200 | | 0 |
| D400 | 12 MPH W | 0 | 0 | 200 | 200 | 200 | 200 | | 0 |
| D500 | 12 MPH W | 0 | 0 | 200 | 200 | 200 | 200 | | 0 |
| D600 | 12 MPH W | 0 | 0 | 200 | 200 | 200 | 200 | | 0 |
| D700 | 12 MPH W | 0 | 0 | 200 | 200 | 200 | 200 | | 0 |
| D800 | 12 MPH W | 0 | 0 | 200 | 200 | 200 | 200 | | 0 |
| D900 | 12 MPH W | 800 | 625 | 200 | 200 | 200 | 25 | 175 | 45 | 0 |
| 1000 | 12 MPH W | 800 | 625 | 200 | 200 | 200 | 25 | 175 | 45 | 0 |
| 1100 | 12 MPH W | 800 | 625 | 200 | 200 | 200 | 25 | 175 | 45 | 0 |
| 1200 | 12 MPH W | 800 | 625 | 200 | 200 | 200 | 25 | 175 | 45 | 0 |
| 1300 | 12 MPH W | 800 | 625 | 200 | 200 | 200 | 25 | 175 | 45 | 0 |
| 1400 | 12 MPH W | 800 | 625 | 200 | 200 | 200 | 25 | 175 | 45 | 0 |
| 1500 | 12 MPH W | 800 | 625 | 200 | 200 | 200 | 25 | 175 | 45 | 0 |
| 1600 | 12 MPH W | 800 | 400 | 200 | 200 | 200 | 200 | 175 | 35 | 225 |
| 1700 | 12 MPH W | 800 | 200 | 200 | 200 | 200 | 200 | 175 | 25 | 425 |
| 1800 | 12 MPH W | 0 | 0 | 200 | 200 | 200 | 200 | | 0 |
| 1900 | 12 MPH W | 0 | 0 | 200 | 200 | 200 | 200 | | 0 |
| 2000 | 12 MPH W | 0 | 0 | 200 | 200 | 200 | 200 | | 0 |
| 2100 | 12 MPH W | 0 | 0 | 200 | 200 | 200 | 200 | | 0 |
| 2200 | 12 MPH W | 0 | 0 | 200 | 200 | 200 | 200 | | 0 |
| 2300 | 12 MPH W | 0 | 0 | 200 | 200 | 200 | 200 | | 0 |
| 2400 | 12 MPH W | 0 | 0 | 200 | 200 | 200 | 200 | | 0 |

View Forecasted Capacity/DA Schedule
For each Wind Unit, forecasted capacity is calculated based on weather and displayed in grey.
Scheduled hours for each wind unit displayed in bold.

Edit Schedules
Allocate scheduled MW across wind units directly in Excel-like cells. Reserves and AGC needed to support wind schedule are calculated as schedule us set and allocated here

Drill Down
Double clicking a wind unit's column will display a "Versify Slideout", drilling down to Turbine level detail (next slide).

Daily Summary

| Dispatch Date | HE | ZZZ Schedule MW | ZZZ Loss % | ZZZ Loss MW | YYY Schedule MW | YYY Loss % | YYY Loss MW | Total Output Required MW | Plant Net | Difference | Ambient Temp Deg.F |
|---|---|---|---|---|---|---|---|---|---|---|---|
| 12/27/2007 | 1 | | 1.5 | | | 5 | | | 3 | 3 | 35.8 |
| 12/27/2007 | 2 | | 1.5 | | | 5 | | | -2.1 | -2.1 | 35.2 |
| 12/27/2007 | 3 | | 1.5 | | | 5 | | | -2.1 | -2.1 | 36.5 |
| 12/27/2007 | 4 | | 1.5 | | | | | | -2.1 | -2.1 | 35.5 |
| 12/27/2007 | 5 | | 1.5 | .4 | | | | | | -3.4 | 34.2 |
| 12/27/2007 | 6 | 25 | 1.5 | 3.4 | | | | .4 | | -.2 | 33.1 |
| 12/27/2007 | 7 | 225 | 1.5 | 3.8 | | | | 89 | | -13.6 | 32 |
| 12/27/2007 | 8 | 250 | 1.5 | 6.8 | | | | .4 | | 10.2 | 33.1 |
| 12/27/2007 | 9 | 450 | 1.5 | 6.8 | | | | .2 | | -9.3 | 35.2 |
| 12/27/2007 | 10 | 450 | 1.5 | 6.8 | | | | 7 | | | 37 |
| 12/27/2007 | 11 | 450 | 1.5 | 6.8 | | | | 7 | | -.1 | 36.2 |
| 12/27/2007 | 12 | 450 | 1.5 | 6.8 | | | | .9 | | | 39.3 |
| 12/27/2007 | 13 | 450 | 1.5 | 6.8 | | | | 7 | | | 48.2 |
| 12/27/2007 | 14 | 450 | 1.5 | 6.8 | | | | 7 | | | 41.2 |
| 12/27/2007 | 15 | 450 | 1.5 | 6.8 | | | | 7 | | | 42.6 |
| 12/27/2007 | 16 | 450 | 1.5 | 6.8 | | | | 7 | | | 42.5 |
| 12/27/2007 | 17 | 450 | 1.5 | 6.8 | | | | 7 | | | 40.1 |
| 12/27/2007 | 18 | 450 | 1.5 | 6.8 | | | | 7 | | | 35.8 |
| 12/27/2007 | 19 | 450 | 1.5 | 6.8 | | | | 7 | | | 34.8 |
| 12/27/2007 | 20 | 450 | 1.5 | 6.8 | | 5 | | 457 | 456.9 | -.1 | 33.6 |
| 12/27/2007 | 21 | 450 | 1.5 | 6.8 | | 5 | | 457 | 457 | | 32.9 |
| 12/27/2007 | 22 | 450 | 1.5 | 6.8 | | 5 | | 457 | 447.6 | -9.8 | 31.8 |
| 12/27/2007 | 23 | 200 | 1.5 | 3 | | 5 | | 203 | 221.6 | 8.8 | 31.3 |
| 12/27/2007 | 24 | 200 | 1.5 | 3 | | 5 | | 203 | 195.9 | -7.1 | 30.8 |
| TOTAL | | 7200 | | 108 | | | | 7311 | 7282.9 | -28.1 | |

Daily Reports
Daily Summary
Day Forecasted Availability
Daily Log
Trading Summary

1000A

VERSIFY™ version 1.4.0

Home • Portfolio • Unit • Event Log • RealTime Monitor • PIEvents • Dashboards | Daily Reports | Unit Performance | Tariff • Outages | Unit Attributes | Contacts Dashboard: [Trading Summary] Location: [Sample] Date: [12/27/2007] [Refresh] Export All Times in Pacific Prevailing Time

Balance Summary

| Flow Date | Burn | Nom | Park | Lend | Daily Balance | Monthly Balance | Running Balance |
|---|---|---|---|---|---|---|---|
| 12/27/2007 | 50,861 | 53,100 | 2,239 | | 2,239 | -10,293 | -8,106 |
| | Purchase | Non $ | Wacog | Imbalance | Imbalance $ | Total $ | |
| | 53100 | $366,490.89 | $6.90 | -2,239 | ($16,027.58) | $350,463.31 | |

Daily Balance

☐ Nom  53.1K
☐ Lend  0
☐ Park  2.24K

Trading

| Flow Date | Trade Num | Purchase/Sale | Counterparty | Delivery Location | Delivery Type | Price | Total Volume | UOM | Trade Type | Tot$ |
|---|---|---|---|---|---|---|---|---|---|---|
| 12/27/2007 | 4431869 | S | Counterparty B | 230 | ATC | $6.90 | -53,100 | MM | Firm | $366,490.89 |

Power Trading

| Flow Date | Trade Num | Purchase/Sale | Counterparty | Delivery Location | Delivery Type | Price | Total Volume | UOM | Trade Type | Tot$ |
|---|---|---|---|---|---|---|---|---|---|---|
| 12/27/2007 | 4431795 | PO | | | | | 3,200 | | | $366,490.89 |
| | | PC | | | | | 3,600 | | | |
| 12/27/2007 | 4431795 | P | Sample Asset Power Cash | AAA230 | Custom | $55.80 | 25 | MWh | Trade TypeA | ($750.00) |
| 12/27/2007 | 4431797 | P | Sample Asset Power Cash | AAA230 | Custom | $57.00 | 3,975 | MWh | Trade TypeA | ($226,575.00) |

Financial Option

| Flow Date | Pk1 Strike Price | Pk2 Strike Price | Strike Price | Pk Power Price | OffPk Power Price | Pk Trade Volume | OffPk Trade Volume | Price | Pk Hedge Value | OffPk Hedge Value | Tot Hedge Value |
|---|---|---|---|---|---|---|---|---|---|---|---|
| 12/27/2007 | $56.39 | $49.71 | $6.83 | $62.41 | $50.69 | 3,600 | 1,800 | | $45,729.00 | $1,788.50 | $47,497.50 |

| Edit | Unit | Event Type | Start Time | End Time | Event Time | Log Entry | Made By | Entered | Ack By |
|---|---|---|---|---|---|---|---|---|---|
| | | | | | 02/20/2008 08:02 | Note Change Breaker Closed This is another comment This is a change | versify | 02/20/2008 08:06 | versify |
| Edit | Sample | Actual Start | | | 02/20/2008 08:02 | Breaker Closed. This is another comment. | versify | 02/20/2008 08:03 | ☐ |
| Edit | Sample | Actual Start | 02/02/2008 05:57 | 02/02/2008 23:59 | | General Note: Sample Comment | versify | 02/20/2008 05:58 | versify |
| Edit | Sample | General Note | | | | Schedule changed. Sold 375 to xyz | versify | 02/20/2008 06:00 | ☐ |
| Edit | Sample | Schedule Update | 02/02/2008 01:59 | 02/02/2008 23:59 | | Schedule changed. Sold 375 to xyz | versify | 02/20/2008 05:59 | ☐ |
| Edit | Sample | Schedule Update | 02/02/2008 01:59 | 02/02/2008 01:59 | | Planned Derating: Sample CT1A Pump Work/Problem (derateId: 33) | versify | 02/20/2008 08:12 | ☐ |
| Edit | Sample CT1A | Derate (max cap change) | 02/02/2008 00:00 | 02/02/2008 | | Breaker Closed: Sample Comment | versify | 02/20/2008 07:00 | versify |
| Edit | Sample | Actual Start | 02/19/200 01:59 | | | Schedule created: 300 MW | versify | 02/20/2008 06:59 | ☐ |
| Edit | Sample | Schedule Update | 02/19/200 00:00 | | | Unplanned Derating: Sample CT1 Annual Inspections (derateId: 32) | versify | 02/20/2008 07:00 | ☐ |
| Edit | Sample CT1A | Derate (max cap change) | 02/18/20 06:09 | | | General Note: ZZZZ. Turning gear disengaged (S1L33TGE.OUT/SIG). | auto | 02/20/2008 06:09 | ☐ |
| Edit | Sample | General Note | | | | General Note: Breaker Closed for ZZZZ CT1A | auto | 02/20/2008 05:49 | ☐ |
| Edit | Sample CT1A | Actual Start | | | | General Note: Breaker Closed for ZZZZ CT1B | auto | 02/20/2008 | ☐ |
| Edit | Sample | Actual Start | | | | | | | |

Event Type
- Actual Shutdown
- Actual Start
- Derate (max cap change)
- Generate Note
- Schedule Change
- Schedule Test
- Schedule Update
- Trip (max cap change)
- Workorder
- Impacting Operations

SYSTEM AND METHOD FOR MANAGING AND MONITORING RENEWABLE ENERGY POWER GENERATION

This application claims the benefit of U.S. provisional patent application No. 61/048,065, which was filed on Apr. 25, 2008 and is incorporated herein by reference in its entirety.

I. FIELD OF THE INVENTION

The present invention relates to a performance monitor for power generators, and more particularly to a performance monitor for renewable power generators that is adaptable to handle data from any data source.

II. DISCUSSION OF THE RELATED ART

The power industry has been rapidly changing with the advent of deregulation as well as other socio-economic factors. As a result, increases in efficiency and control of power generation costs are becoming of more importance. To meet the industry needs, a large number of siloed information technology (IT) applications have been introduced. However, these applications are typically not built with integration in mind with each application being too proprietary in nature and specifically tailored for a particular power generation operation. Accordingly, collection and integration of data from these applications and systems are extremely difficult outside of the intended operation. Many have sought to create a large scale data warehouse to solve this integration problem but still face significant challenges.

Another difficulty with prior art systems is the disparate number of locations even within the organization that need access to the data. For example, within a power company, traders on a central trade floor, plant personnel at each power plant, engineers stationed regionally, management dispersed throughout the organization, and third parties all need access to the data in some form. The traditional siloed applications are typically client-server based applications and are difficult to configure for access by everyone in need of the data.

In addition, due to the generally isolated nature of the prior art systems as described above, combining qualitative event type data (e.g., real-time or recorded plant operations data) and quantitative data (e.g., Supervisory Control and Data Acquisition (SCADA) and market data) becomes difficult and cumbersome, if not impossible, due to the size and disparity of the data. On the other hand, such information is important in determining proper operation of power generation as back office settlement activities determine penalties associated with under or over production of power, for example. Typically, back office personnel manually extract data from a number of different IT systems in the organization to determine the activities that occurred in prior reporting periods. Many times, logs maintained in word processors or hand written documents must be searched manually.

Moreover, when a type of report is required, IT developers have to develop some level of custom code to extract data from the data and format the data properly onto a report. This task becomes even more complicated when disparate data sources with varying data formats are used.

These problems are only magnified when applied to renewable energy power plants that use water, solar, and wind energy to generate power. Unlike traditional power plants that use fossil or nuclear fuels, most renewable energy power plants include smaller power generation units, some as low as one to ten units while others include hundreds and even thousands of units that can spread across a large tract of land. For example, a wind farm can include hundreds of wind turbine generators over many acres. The large number of power generation units are required because each renewable energy power generation units generally produce between 0.5 MW (megawatts) and 2 MW of power compared to traditional fossil or nuclear plants of 2-5 generation units producing about 100-500 MW each.

In addition to the large number of generation units, renewable energy power generation units, such as wind and solar energy, are highly dependent on meteorological conditions, which may vary significantly within different regions of a single power plant due to the large surface area covered by the power generation units. Moreover, the power generated by renewable energy power generation units may fluctuate over a period of time as the amount of sunlight, wind, or water level change based on the weather. To manage and operate these types of power plants, it is imperative for operators to know the actual meteorological conditions across a plant, as well as the forecasted weather conditions in incremental time frames throughout the day (e.g., 15 minutes ahead, 30 minutes, ahead, 1 hour ahead, etc.).

Finally, to have value, the produced energy must be steady and reliable (i.e., "firm"). In order words, the amount of energy provided in a give time frame (e.g., 1 hour) must be produced on a guaranteed basis. Because the generated power may fluctuate for the reasons discussed above, renewable energy plant operators have to keep track of automatic generation control (AGC) sources in addition to the power generation units to "firm-up" the power produced. AGC is an energy product where power generators operate to increase or decrease the generated power inversely to the performance of the renewable energy power generation units. For example, a wind power plant that has committed to delivering 10 MW of firm energy in a given hour must be able to reliably deliver that amount. If the wind turbines at this wind power plant can only produce 7 MW of this energy, the remaining 3 MW must be made up from an AGC source. If the wind is stronger than expected and the wind turbines are able to produce 7.5 MW, the AGC source of energy automatically senses the shortfall and lowers the AGC output to only 2.5 MW to guarantee that the 10 MW of energy is delivered. Likewise, if a cloud blocks the sun that causes a solar power plant to generate only 6.8 MW, the AGC source automatically increases its output to make up the difference to bring the power level up to 10 MW. The system of the present invention may intertface with third-party renewable energy forecasting systems to leverage the availability of proprietary, sophisticated forecast models, which may, for example, be used to predict anticipated renewable energy availability.

Because existing energy scheduling, dispatch, and reporting systems are designed only for traditional power plants, these existing systems do not and cannot address any of the issues described above for renewable energy power plants.

III. SUMMARY OF THE INVENTION

Accordingly, the present invention is directed to a system and method for monitoring renewable energy power generation operations that substantially obviates one or more problems due to limitations and disadvantages of the related art.

An object of the present invention is to provide a system and method for collecting renewable power generation operation data from disparate data sources and generating a report of the performance of the operation.

Another object of the present invention is to provide a system and method for monitoring and managing renewable energy power generation units for optimized performance.

Yet another object of the present invention is to provide a system and method for scheduling energy from renewable energy power plants including calculation of automatic generation control (AGC).

Still yet another object of the present invention is to provide a system and method for forecasting energy based on current and future meteorological conditions.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a system includes a communications network, a plurality of remotely located data sources to provide power data, the power data including quantitative and qualitative data of one or more renewable energy power generation units, and a performance monitor in communication with the plurality of remotely located data sources through the communications network, the performance monitor including a data store to store the power data, and a power manager to manage generation of power from the one or more renewable energy power generation units.

In another aspect, a method includes communicating with a plurality of remotely located data sources from a performance monitor via a communications network, the plurality of remotely located data sources providing power data including quantitative and qualitative data of one or more renewable energy power generation units, extracting the power data from the plurality of remotely located data sources, storing the power data in a data store, and managing power generated by the one or more renewable energy power generation units based on the power data.

It is to be understood that both the foregoing general description and the following detailed description are exemplary and explanatory and are intended to provide further explanation of the invention as claimed.

IV. BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 2 illustrates an exemplary energy scheduling module;

FIGS. 10A and 10B show exemplary embodiments of a daily report interface in accordance with the present invention;

FIGS. 11A and 11B show exemplary embodiments of a unit performance report interface in accordance with the present invention;

FIG. 12 illustrates an exemplary unit interface in accordance with the present invention;

FIG. 14 illustrates an exemplary event log interface in accordance with the present invention;

V. DETAILED DESCRIPTION OF THE INVENTION

General Description

Figure 1:
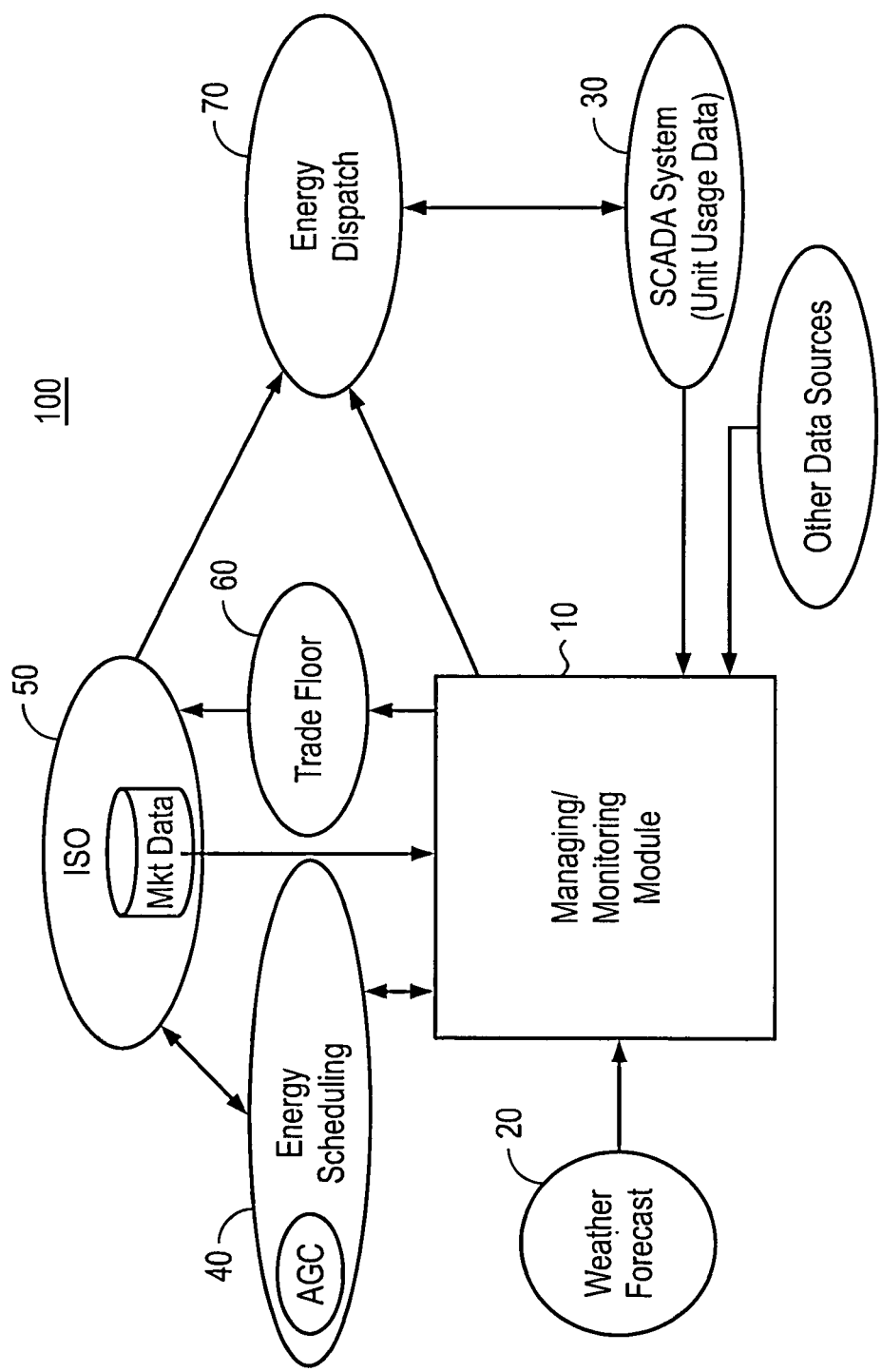
FIG. 1 shows a block diagram illustrating an overall system of an exemplary embodiment of the present invention.

The invention generally encompasses systems including:
a communications network;
a plurality of remotely located data sources to provide power data, the power data including quantitative and qualitative data of one or more renewable energy power generation units; and
a performance monitor in communication with the plurality of remotely located data sources through the communications network, the performance monitor including
a data store to store the power data, and
a power manager to manage generation of power from the one or more renewable energy power generation units.

In certain illustrative embodiments, the quantitative data includes supervisory control and data acquisition (SCADA) data from a renewable energy power plant and/or market data.

In certain illustrative embodiments, the quantitative data includes operational cost data of the one or more renewable energy power generation units.

In certain illustrative embodiments, the qualitative data includes event log data of the one or more renewable energy power generation units.

In certain illustrative embodiments, the qualitative data includes meteorological condition in a geographical region in which one or more renewable energy power generation units are located.

In certain illustrative embodiments, the meteorological condition is current condition or forecasted condition.

In certain illustrative embodiments, the power manager forecasts power capability of the one or more renewable power generation units based on the meteorological condition.

In certain illustrative embodiments, the power manager includes energy scheduling.

In certain illustrative embodiments, the energy scheduling includes balancing energy source.

In certain illustrative embodiments, the balancing energy source is an automatic generation control (AGC) source.

In certain illustrative embodiments, the power manager includes energy dispatch monitoring.

In certain illustrative embodiments, the energy dispatch monitoring includes a map interface overlaid with forecasting, performance and meteorological indicators of geographical regions in which one or more renewable energy power generation units are located.

In other embodiments the invention encompasses a method, including:

communicating with a plurality of remotely located data sources from a performance monitor via a communications network, the plurality of remotely located data sources providing power data including quantitative and qualitative data of one or more renewable energy power generation units;

extracting the power data from the plurality of remotely located data sources;

storing the power data in a data store; and monitoring and managing power generated by the one or more renewable energy power generation units based on the power data.

In certain illustrative embodiments, the quantitative data includes supervisory control and data acquisition (SCADA) data from a renewable energy power plant and/or market data.

In certain illustrative embodiments, the quantitative data includes operational cost data of the one or more renewable energy power generation units.

In certain illustrative embodiments, the qualitative data includes event log data of the one or more renewable energy power generation units.

In certain illustrative embodiments, the qualitative data includes meteorological condition in a geographical region in which one or more renewable energy power generation units are located.

In certain illustrative embodiments, the meteorological condition is current condition or forecasted condition.

In certain illustrative embodiments, the method includes the step of forecasting power capability of the one or more renewable power generation units based on the meteorological condition.

In certain illustrative embodiments, the method includes scheduling energy.

In certain illustrative embodiments, the scheduling of energy includes balancing energy source.

In certain illustrative embodiments, the balancing energy source is an automatic generation control (AGC) source.

In certain illustrative embodiments, the method includes monitoring energy dispatch.

In certain illustrative embodiments, the energy dispatch monitoring includes a map interface overlaid with forecasting, performance and meteorological indicators of geographical regions in which one or more renewable energy power generation units are located.

In another embodiment, the invention encompasses a computer-readable storage medium, storing one or more programs configured for execution by one or more processors, the one or more programs comprising instructions to:

communicate with a plurality of remotely located data sources from a performance monitor via a communications network, the plurality of remotely located data sources providing power data including quantitative and qualitative data of one or more renewable energy power generation units;

extract the power data from the plurality of remotely located data sources;

store the power data in a data store; and monitor and manage power generated by the one or more renewable energy power generation units based on the power data.

Reference will now be made in detail to the embodiments of the present invention, examples of which are illustrated in the accompanying drawings.

The system and method of the present invention is a flexible solution both in terms of the type and amount of data processed and in terms of monitoring and reporting to the above identified problems of the prior art. In general, the system and method of the present invention is a hosting asset performance monitoring and reporting tool used by owners or power generators, such as independently owned utilities, municipalities, and cooperatives, for example. In particular, the exemplary embodiments set forth below are advantageous in monitoring the performance of renewable energy power plants that include many renewable energy power generation units. It is to be understood that other users and benefits may be realized without departing from the scope of the invention.

As applied to renewable energy power plants, the system and method of the present invention tracks and monitors the operational performance of hundreds of thousands of renewable energy power generating units including automatic generation control (AGC) sources, real-time meteorological data in each of the regions in which the renewable energy power generation units operate, and forecasts of meteorological conditions in the generation unit regions in specified future time increments to manage energy scheduling, energy dispatch, and performance reporting. For example, the system and method of the present invention provides dashboard reporting (e.g., for management-level), summary/drill-down reporting (e.g., back office processing), daily operational reporting (e.g., operations), query interface for plant supervisory control and data acquisition (SCADA) information on ad-hoc basis, and near real-time status and logging capabilities. Accordingly, the system and method of the present invention provides, for example, logged information created by automated plant monitoring systems and/or plant personnel as events occur with relative SCADA and market information. The details of the system and method of the present invention are described below.

FIG. 1 shows a block diagram illustrating an overall system of an exemplary embodiment of the present invention. As shown in FIG. 1, the system of the present invention includes monitoring module 10 that receives real-time and forecasted meteorological data from weather forecast source 20 and usage and performance data of each of the renewable energy power generation units from SCADA system 30. The renewable energy power generation units may be wind turbines, hydro-turbines, solar panels, and the like. Other renewable energy power generation units may be used without departing from the scope of the invention.

The monitoring module 10 processes the unit usage and performance data from the SCADA system 30 and meteorological data 20 to calculate available capacity of a renewable energy power plant based on the current and forecasted weather conditions of the geographical regions in which each of power generating units is located. Because renewable energy power generation units are generally configured in sets or lines based on geographical location within a power generating facility, the monitoring module 10 calculates the available capacity based on current and forecasted weather conditions for each generating unit and summarizes the energy capacity at line and plant levels. Accordingly, the monitoring module 10 allows energy to be scheduled at any aggregate level and allocates scheduled energy (i.e., power to be generated) down to the individual generation unit level. As energy is calculated for a given time frame (e.g., 1 hour), the monitoring module 10 also calculates the amount of AGC required to firm up the scheduled energy.

A user accesses the energy schedule through the energy scheduling module 40 to view, modify, and manage the scheduled energy. FIG. 2 illustrates an exemplary user interface for energy scheduling 200. As shown in FIG. 2, the exemplary user interface 200 of the energy scheduling module 40 provides forecasted capacity and the scheduled hours for each generation unit. The schedule may be edited directly in the energy scheduling module 40 to allocate scheduled power to be generated and to calculate AGC needed to support the generation schedule. Generation unit level information may be accessed by drilling down into each schedule via a slideout interface that shows unit level details.

The monitoring module 10 also receives market information from market data source 50, such as independent source operators (ISO), for example, to assist a user in buying and/or selling the scheduled energy, and/or estimate cost and revenue. Using the market information, the monitoring module 10 may be used to send buy/sell requests to the trading system 60.

Figure 3:
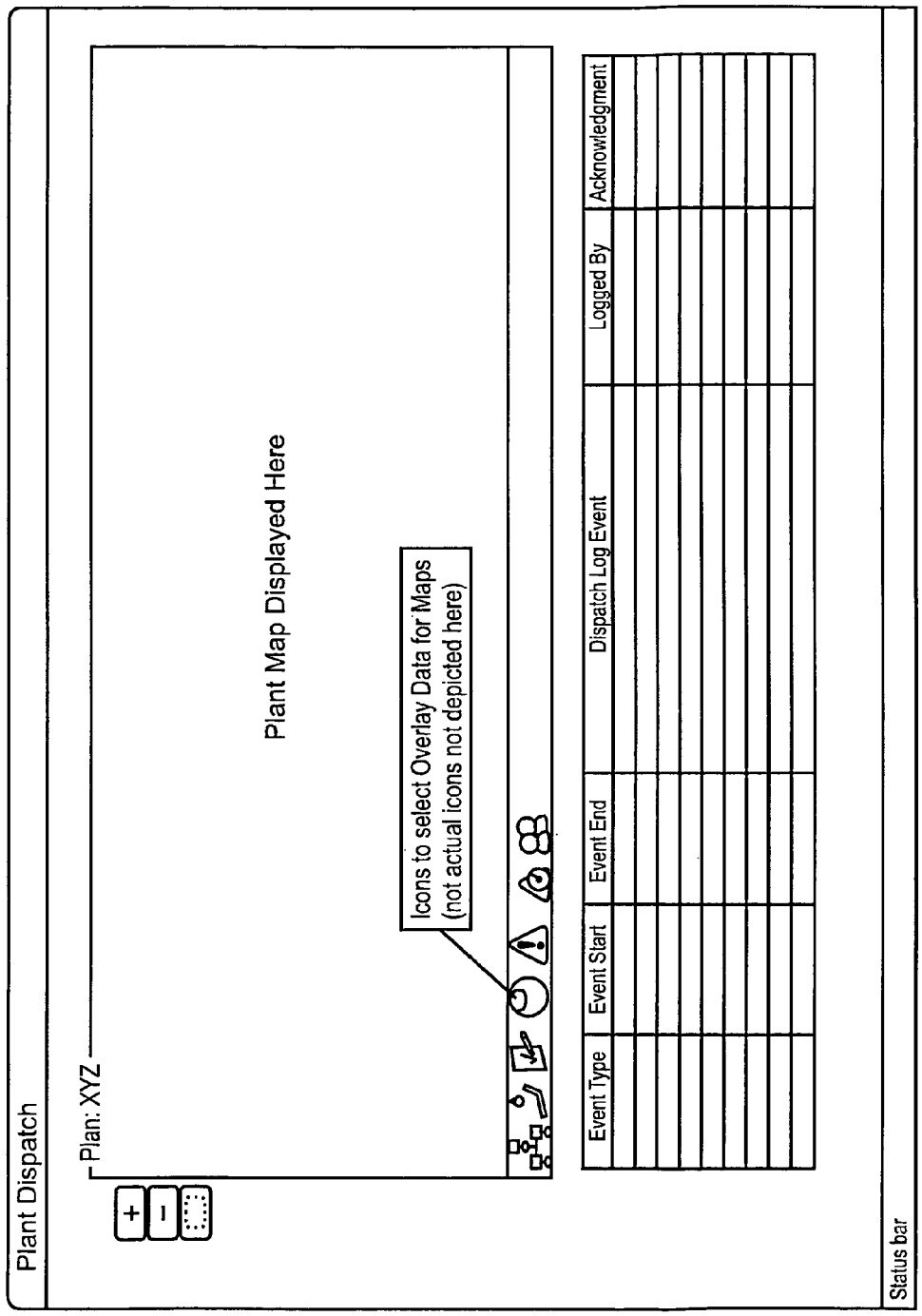
FIG. 3 illustrates an exemplary energy dispatch module.
Figure 17:
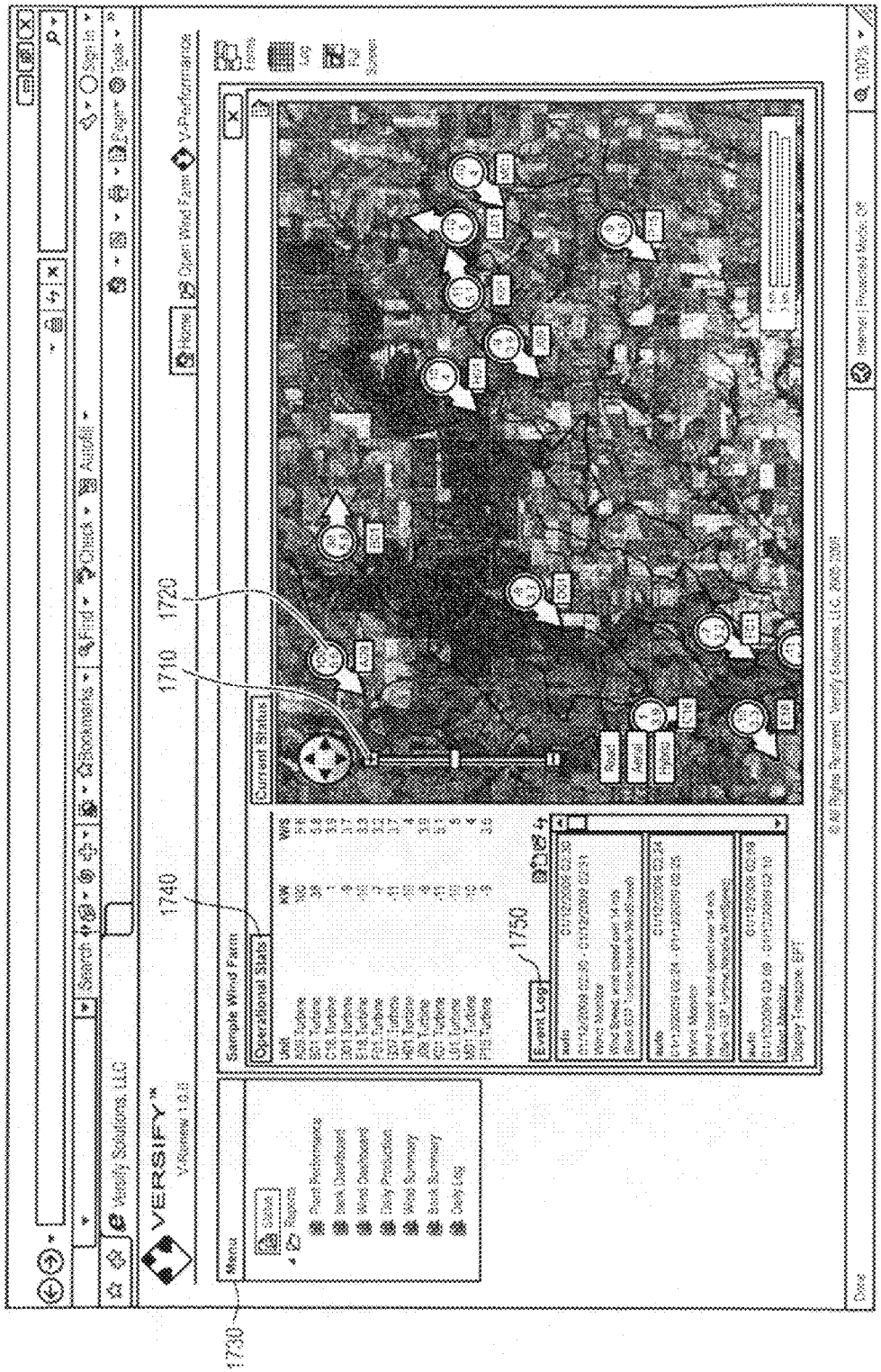
FIG. 17 illustrates a renewable energy plant monitoring interface in accordance with the present invention.
Figure 18:
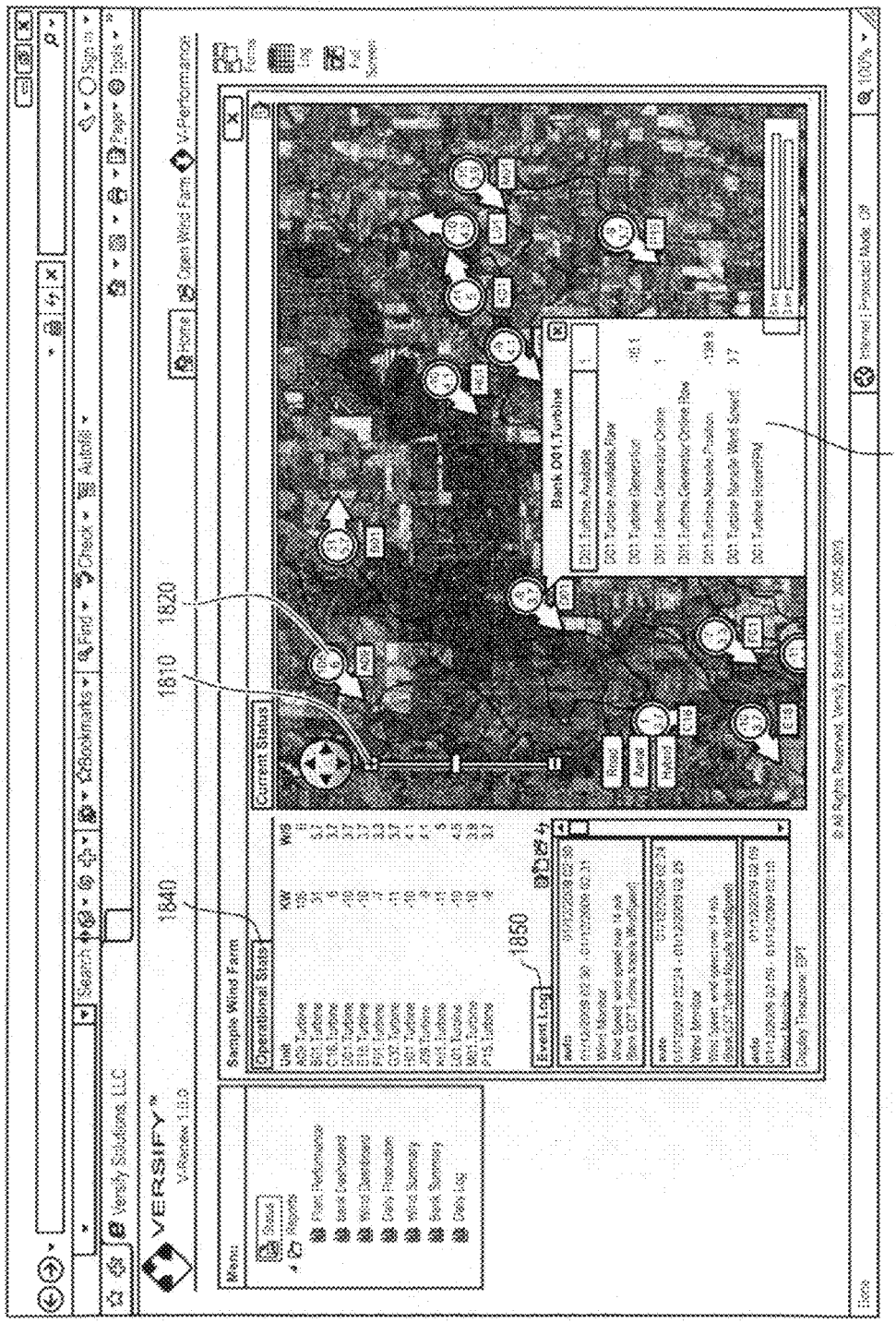
FIG. 18 illustrates an exemplary renewable energy plant monitoring interface with a turbine drill-down interface in accordance with the present invention.

Once a plant is operating according to a schedule, the monitoring module 10 collects and processes performance information from the SCADA system 30 and provides real time statistics and alerts of events to operators of the plant through the energy dispatch module 70. Because renewable energy power plants are highly dependent on current and future weather conditions, and because each power generation unit is impacted differently depending on the physical location of the unit, the energy dispatch module 70 includes a graphical user interface of a map of the geographical region where the monitored power plant is located as shown in FIGS. 3 and 17-18. The graphical user interface 300, 1700/1800 allows the user to zoom 1710, 1810 into a particular region of the plant for further detail. In an exemplary embodiment, regardless of the zoom level, current and future conditions including weather are overlaid onto the map 1720, 1820 using animated, color coded icons, and other indicators to visually verify operational parameters of the plant and weather conditions. These indicators may be drilled down to display the details 1830. In addition to visual indicators, streaming data 1740/1840, 1750/1850 may also be overlaid.

Figure 4:
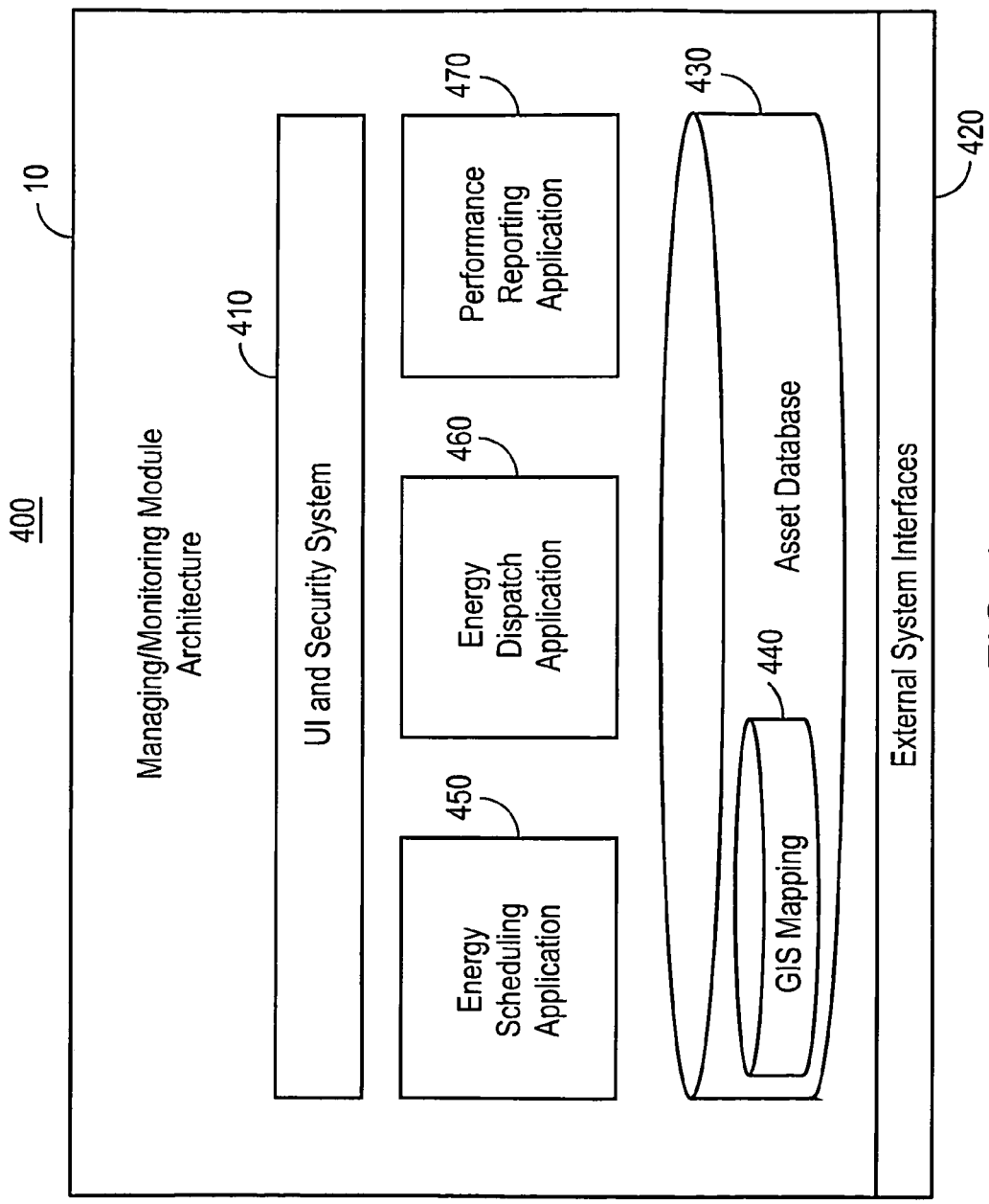
FIG. 4 shows a block diagram of an exemplary architecture of the monitoring module of the present invention.

FIG. 4 shows a block diagram of an exemplary architecture 400 of the monitoring module of FIG. 1. As shown in FIG. 4, the monitoring module 10 includes a user interface (UI)/security layer 410, external system interface layer 420, an asset database 430 that includes geographical information system (GIS) mapping data 440, energy scheduling layer 450, energy dispatch layer 460, and performance reporting layer 470. The UI/security layer 410 provides the mechanism for users to gain access to the monitoring module 10, the details of which are explained further below. The external system interface layer 420 connects the monitoring module to external systems, such as the meteorological source 20, SCADA system 30, market data source 50, trading system 60, and other external systems, such as AGC units, for example.

Asset database 430 stores historical/real-time performance and market data, such as the generation unit operational and usage data, current and future weather data (e.g., wind direction/speed), energy market data (e.g., MW generated), alert parameters, as well as performance statistical data, energy schedules, all other data discussed above, and other data related to operation, performance, and management of renewable energy power plants. Included in the asset database 430 is GIS mapping data 440 that includes geographical information of where the power generation units and plant are located (e.g., longitude, latitude, terrain, etc.) as well as detailed information about the plant (e.g., location of each generation unit, type of unit, operational details of the unit, etc.). Sitting on top of the asset database 430 are the energy scheduling layer 450 that performs the calculation of energy capacity based on the characteristics of each generation unit and meteorological information, calculation of AGC needed to firm up the scheduled energy, and the like, energy dispatch layer 460 that performs the monitoring operations of each generation unit as well as each of the power plants, and performance reporting layer 470.

Figure 5:
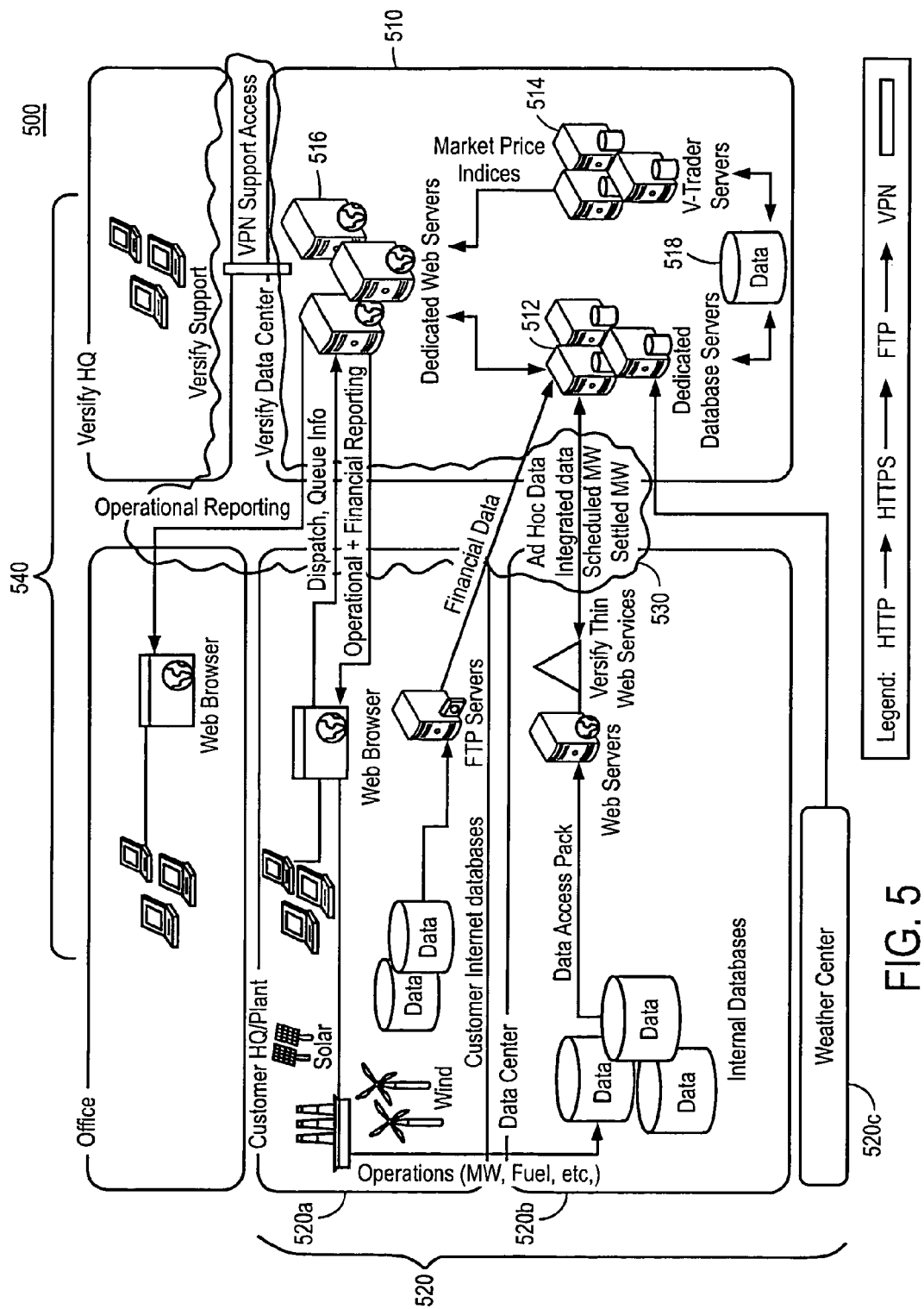
FIG. 5 shows a block diagram illustrating an exemplary system architecture of the present invention.

FIG. 5 shows a block diagram illustrating an exemplary system architecture 500 of the present invention. As shown in FIG. 5, the system of the present invention includes a hosting monitoring center 510 in communication with a plurality of remotely located disparate data sources 520 over a communications network 530. The communications network may be any data communications network, such as point-to-point connections, local area networks (LAN), wide area networks (WAN), Internet, etc. and may be over a wired or wireless communication medium. The remotely located disparate data sources 520 provide qualitative information (e.g., events type data) and quantitative information (e.g., market data) related to a hosted power generating unit. For example, as shown in FIG. 5, the hosting monitoring center 510 may be in communication with a hosted power plant 520a and SCADA data center 520b. SCADA data center 520b may be any data source that archives time-series SCADA or telemetry data of a power generator, also sometimes referred to as SCADA historian, such as megawatts produced, fuel consumption in case of traditional power plants, etc. Generally, SCADA data center 520b collects SCADA information from a plurality of power generation units located within a defined region. However, any SCADA data source may be used without departing from the scope of the present invention. The hosted power plant 520a provides internal operations data of the power plant, such as operational event logs, the amount of power being generated, operational cost information (including unit design and budget data), etc. "Budget" data, as used herein, includes financial/cost expectations as well as operational expectations, such as expected hours of operation, expected number of starting the generators over a projected time frame, how much power is expected to be generated by each power generating unit and/or the power plant, etc. It is to be understood that the data provided by the hosted power plant 520a may overlap with the information provided by the SCADA data center 520b and may be used independently of, or in conjunction with, each other. Current and future meteorological data is provided by weather center 520c. The meteorological data may be obtained for historical/current conditions as well as future conditions in a specified time increment (e.g., 1 day ago, 1 hour ago, present time, 15 minutes ahead, 30 minute ahead, 1 hour ahead, etc.). Other remote data sources may include market and financial information data services (not shown) that provide historic and real-time market information to the monitoring center 510.

The hosting monitoring center 510 includes power data server 512, market data server 514, and web server 516. It is to be understood that these servers may be implemented in a single machine or a plurality of machines without departing from the scope of the invention. The power data server 512 and market data server 514 are configured to obtain data from any number of the disparate data sources 520. The data sources 520 may be databases from hosted or unhosted systems, such as independent system operators (ISOs), regional system operators (RSOs), and SCADA data centers, for example. The data may also be obtained from internal data sources of hosted and unhosted system, such as data from internal databases, spreadsheets, and other software packages. The power data server 512 and market data server 514 convert the collected data into a common format and store the transformed data in data store 518. The data store 518 may be a single or a plurality of data storage devices and may be implemented as a direct data repository or a relational database. Other data store configurations may be used without departing from the scope of the present invention. The web server 516 communicates with client devices 540 to provide monitoring functionality to the users. Client devices 540 may be workstations, notebooks, digital personal assistants, and other data-enabled devices. The web server 516 processes the requests from the client devices 540 and provides the requested information via reports and alarms to be described further below.

In an exemplary embodiment of the present invention, the web server 516 communicates with the client devices 540 via web-based applications. In the exemplary embodiment, the client devices 540 only need a web browser and do not require any specialized applications. The web server 516 includes a proprietary XML:HTTP(S) callback architecture to initiate requests from a browser from the client device 540, for example, back to the web server 516.

Figure 6:
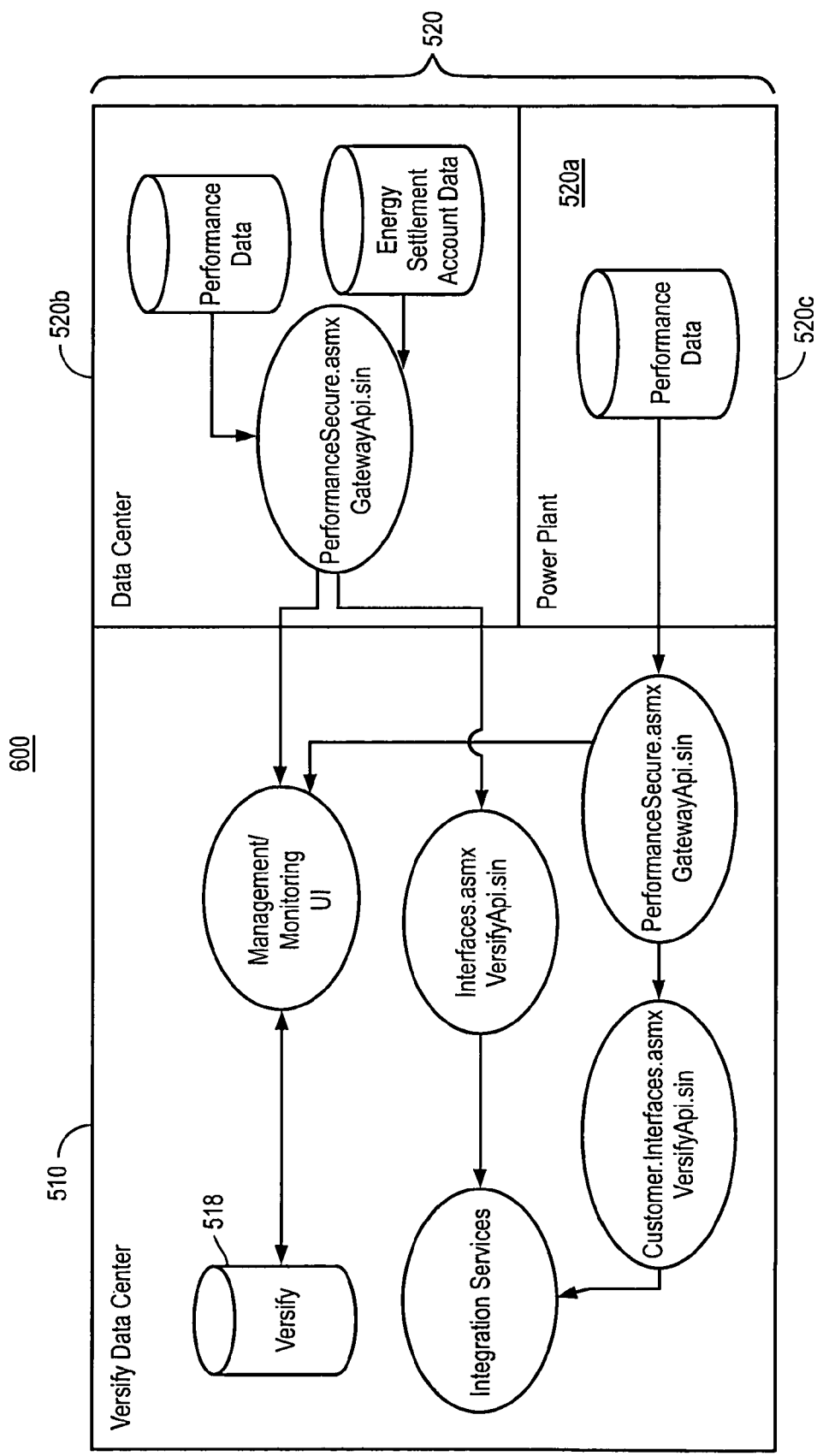
FIG. 6 shows a block diagram illustrating an exemplary embodiment of a communication interface architecture of the present invention.

FIG. 6 shows a block diagram illustrating an exemplary embodiment of a communication interface architecture 600 of the present invention. As shown in FIG. 6, the system and method of the present invention extracts data from any number of disparate data sources 520 using a combination of web services and server integration services (e.g., SQL). For example, the interface architecture in accordance with the exemplary embodiment of the present invention includes hosted GatewayAPI web service located behind the hosted system's firewalls, Hosting Interface API web service located behind the firewall of the web server 516 that communicates with the hosted GatewayAPI, and server integration services that communicate with the interface web service, located on the data servers 512 and 514. It is to be understood that locations of the services and additional services may be used without departing from the scope of the invention.

The GatewayAPI in accordance with the exemplary embodiment of the present invention extracts data from the hosted system's internal applications. The GatewayAPI accesses known APIs of other commercial software systems and databases as well as any custom code needed to pull data from the hosted system's internal proprietary applications. In an exemplary embodiment, the GatewayAPI extracts data and returns the data to the web service client as either an ADO dataset or XML document.

The Hosting Interface API in accordance with the exemplary embodiment of the present invention provides the ability to communicate with the Gateway API and contains interface logic to transform data into a common data format. The Hosting Interface API, for example, pulls hourly, snapshot, and market data into the data store 518. The Hosting Interface API also generates log events from SCADA information.

The server integration services (e.g., SQL) in accordance with the exemplary embodiment of the present invention drive the communication interfaces. The server integration services utilize data to execute, monitor, and report on scheduled interfaces for each hosted system. In accordance with an exemplary embodiment of the present invention, the SQL server integration services includes "retry" logic to ensure that data is not missed due to any sort of system failure.

Once the qualitative and quantitative information of the hosted power generating unit (e.g., power plant 520*a*), the web server 516 of the hosting monitoring center 510 provides customized reports to the client devices 540 through report interfaces implemented on the web server 516. The report interfaces in accordance with an exemplary embodiment of the present invention are built from a customizable library of report interfaces. The report interfaces of the present invention are customized using extensible markup language (XML) based "config files" that contain information about what data to extract and how to format the data on a report interface. Accordingly, the XML config files in accordance with the present invention combine data from any number of disparate systems into a comprehensive report. The XML config files of the present invention simply map data from the data store 518 directly to a report interface without requiring any customized code.

Figure 7:
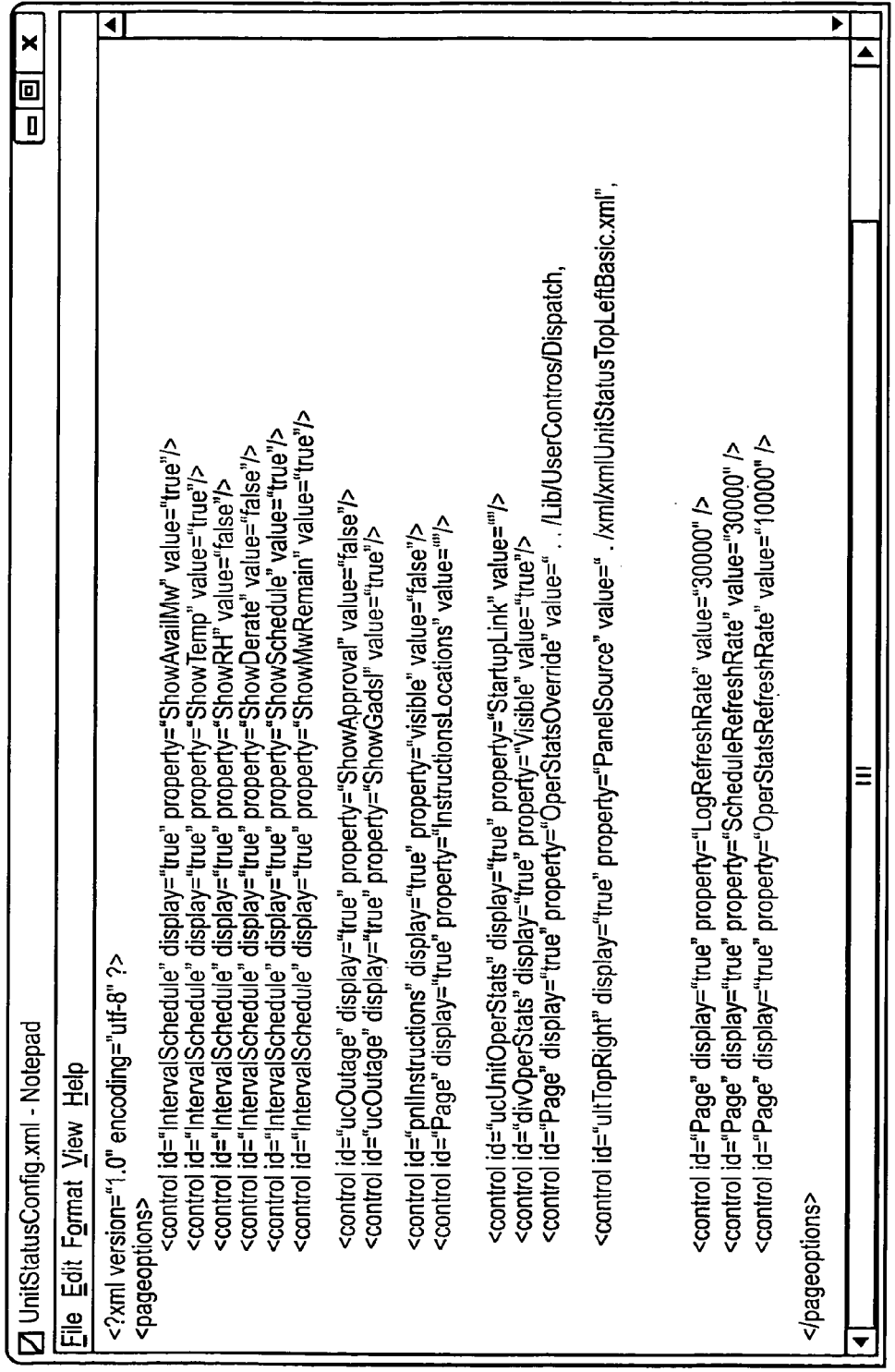
FIG. 7 is an example of a configuration file in accordance with the present invention.

An exemplary embodiment of the present invention includes page config files and reports config files. The page config file 700, as shown in FIG. 7, includes XML that may direct the page to change any property of the page itself, or any property of any control on the page. This allows the user interface to be changed without writing any code and increases maintainability across multiple client devices 540. For example, when the page initially loads, the browser automatically looks for a page config file. If a page config file is found, the browser processes the XML for the page contained in the page config file. Each page or control property identified in the XML is then set based on the page config file setting. To illustrate, a button on the page may be hidden by setting the visible property of the button equal to hidden. Furthermore, properties have been created on certain pages such a unit status report interface, to be explained below, that allow customization of entire sections of the page through the use of custom user controls.

The reports config file defines the layout of a report interface using XML included in the reports config file. The reports config file includes XML fragments for each object to be displayed on the report interface (e.g., graph, pie chart, data table, etc.) The XML fragment includes information specific to the object being shown (e.g., location on report, height, width, colors, etc.) as well as mapping information back to the data store 518 as to what data should be displayed. There may be mappings to multiple stored procedures defined for a single report object. For example, a chart may pull hourly megawatt (MW) data from one stored procedure and hourly price information from another in conjunction with a reporting engine to be described below. In an exemplary embodiment, a reports config file may be defined for a single report but have different configurations depending on what hosted system (e.g., power plant) the report is for. For example, each reports config file may have a "default" configuration defined. For any hosted system (e.g., power plant) or unit (e.g., generator, wind turbine, solar panel, etc.) referred to as "locations," where the report is to have a different look and feel and/or different data source, a subsequent "override" XML fragment is defined for the location. Any location that does not have the override fragment reverts to the default layout.

Figure 8:
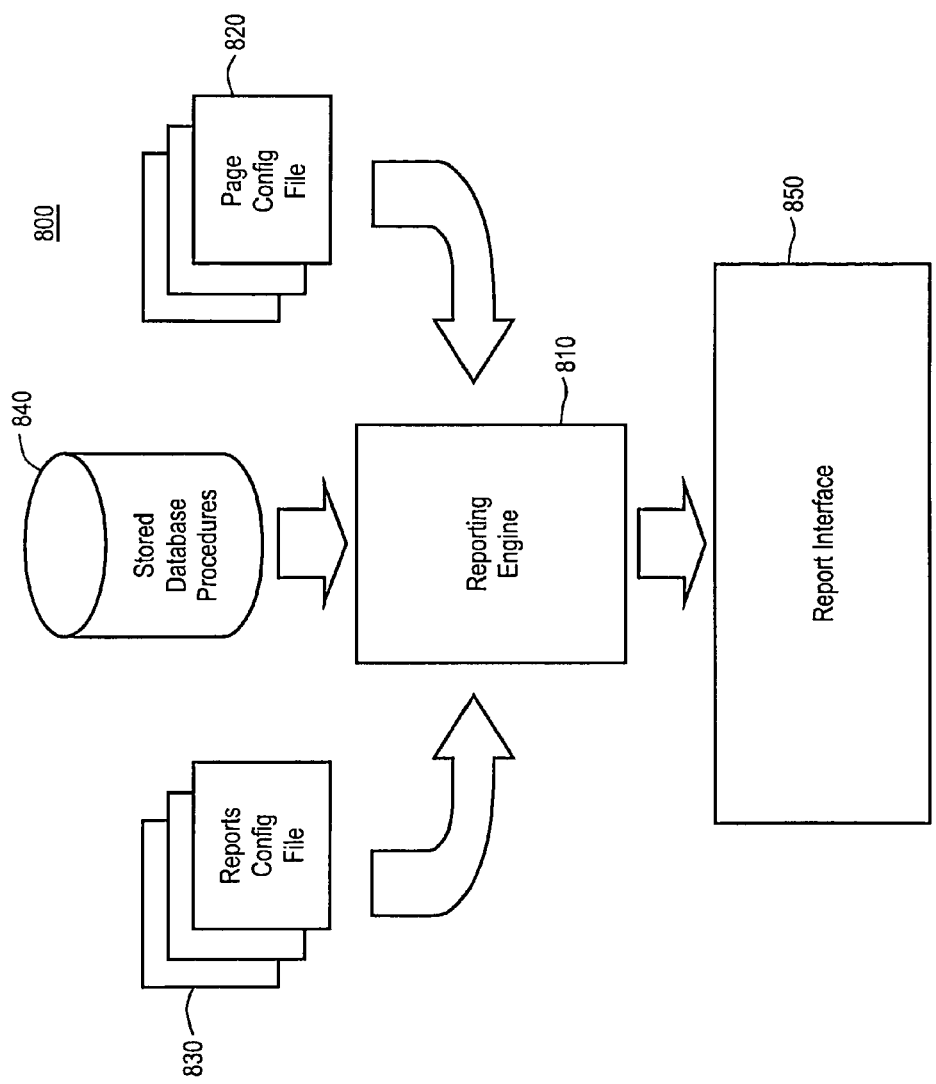
FIG. 8 shows a block diagram illustrating an exemplary embodiment of generating a report interface in accordance with the present invention.

FIG. 8 shows a block diagram illustrating an exemplary embodiment of the performance reporting layer 800 in accordance with the present invention. A reporting engine 810 processes the page config file 820 and reports config file 830, executes the stored procedures identified 840, and creates and formats the report objects on a report interface 850. The reporting engine 810 returns an HTML div containing the formatted report. The reporting engine 810 loads the reports config file 830 and identifies all of the stored procedures to call using an XPATH query. Once the reporting engine 810 has gathered a list of stored procedures, the reporting engine 810 executes each one, via a data access layer. By executing all stored procedures once and holding them in memory for report processing, extraneous database calls are eliminated to optimize performance. Each returned result set is stored in memory for the remainder of the report processing. The reporting engine then iterates through the report objects to build the actual report interface 850. Object classes are defined for each possible report object (e.g., chart, pie chart, gauge, thermometer, note, table, etc.). The object classes include logic to generate HTML and format data appropriately for each type of report object. For each report object, the reporting engine 810 creates an instance of the class and initializes the object generating basic HTML required. The reporting engine 810 then iterates through each mapped data item to be illustrated in the report object and passes the data item to the class from the appropriate result set extracted from the database earlier. The class processes the data into HTML (or XML) for the report item and finally returns the completely formatted HTML, which is then inserted into the HTML div tags.

In an exemplary embodiment of the present invention, the report interface 850 is categorized as one of the following: dashboard report interface, daily operational report interface, quantitative summary/drill-down report interface (also referred to as "unit performance" interface), an ad-hoc SCADA query interface, and unit status communication interface.

FIGS. 9A-9L show exemplary embodiments of the dashboard report interface 900A-L. The dashboards page allows users to select any configured dashboard for any power plant within the data store 518. FIGS. 9A-9L show exemplary embodiments of the following dashboards, respectively: Operations, Megawatts (MW) Availability, Budget, Cost/Revenue, MTD Portfolio Summary, YTD Portfolio Summary, Fuel Trading Summary, Power Trading Summary, Spark Spread Summary, Financial Option Summary.

Figure 9A:
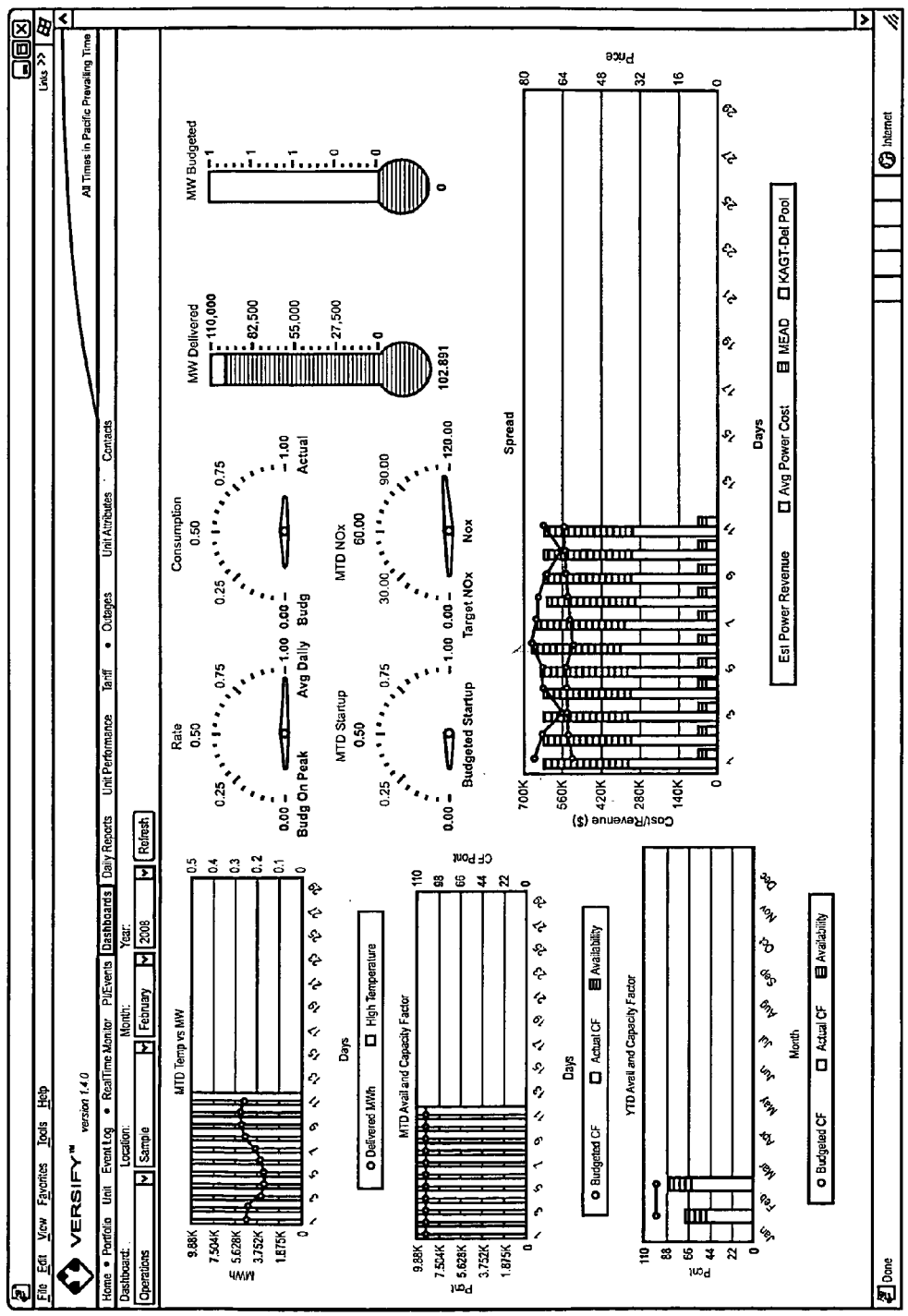
FIGS. 9A-9L show exemplary embodiments of a dashboard report interface in accordance with the present invention.
Figure 9B:
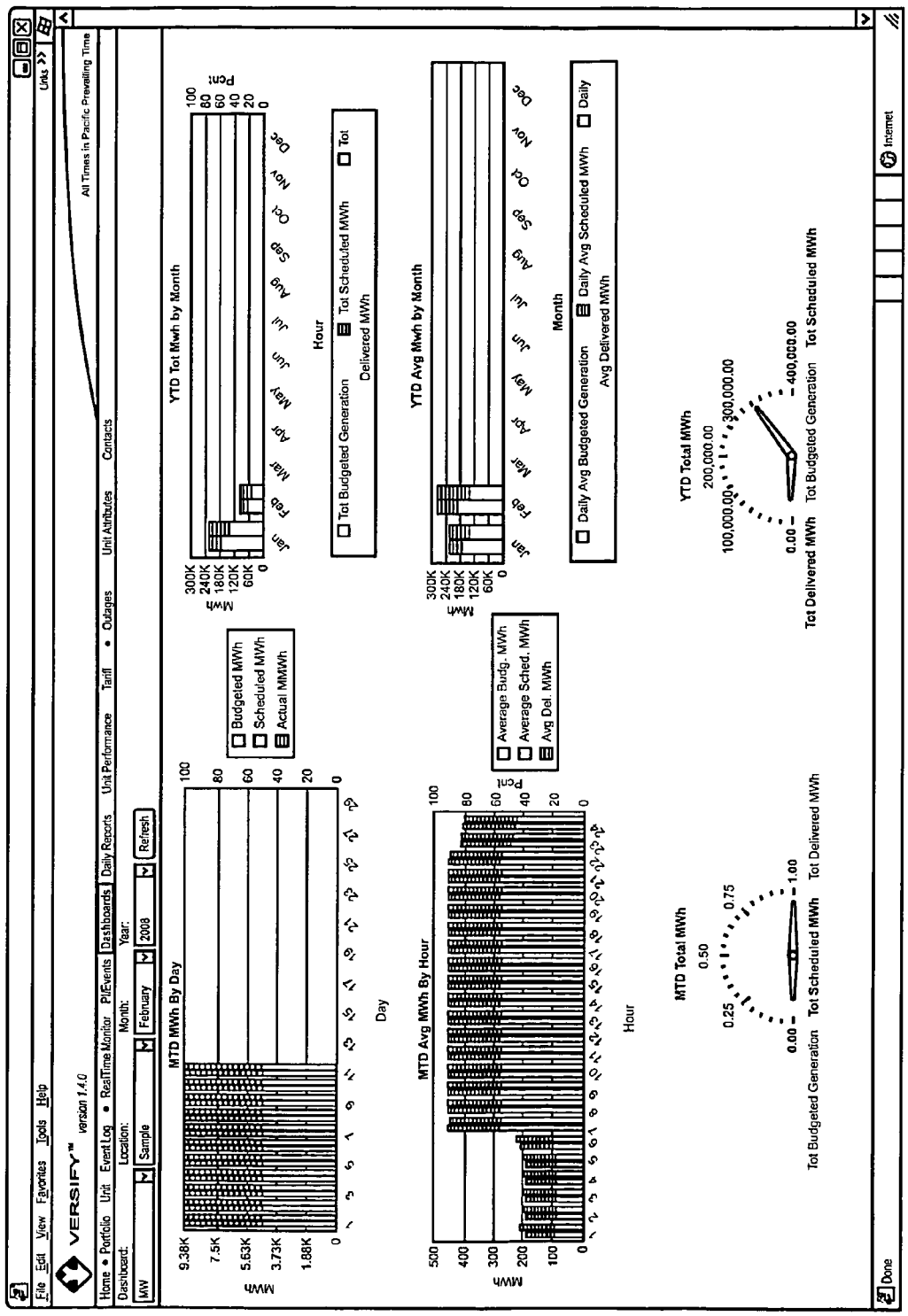
Figure 9C:
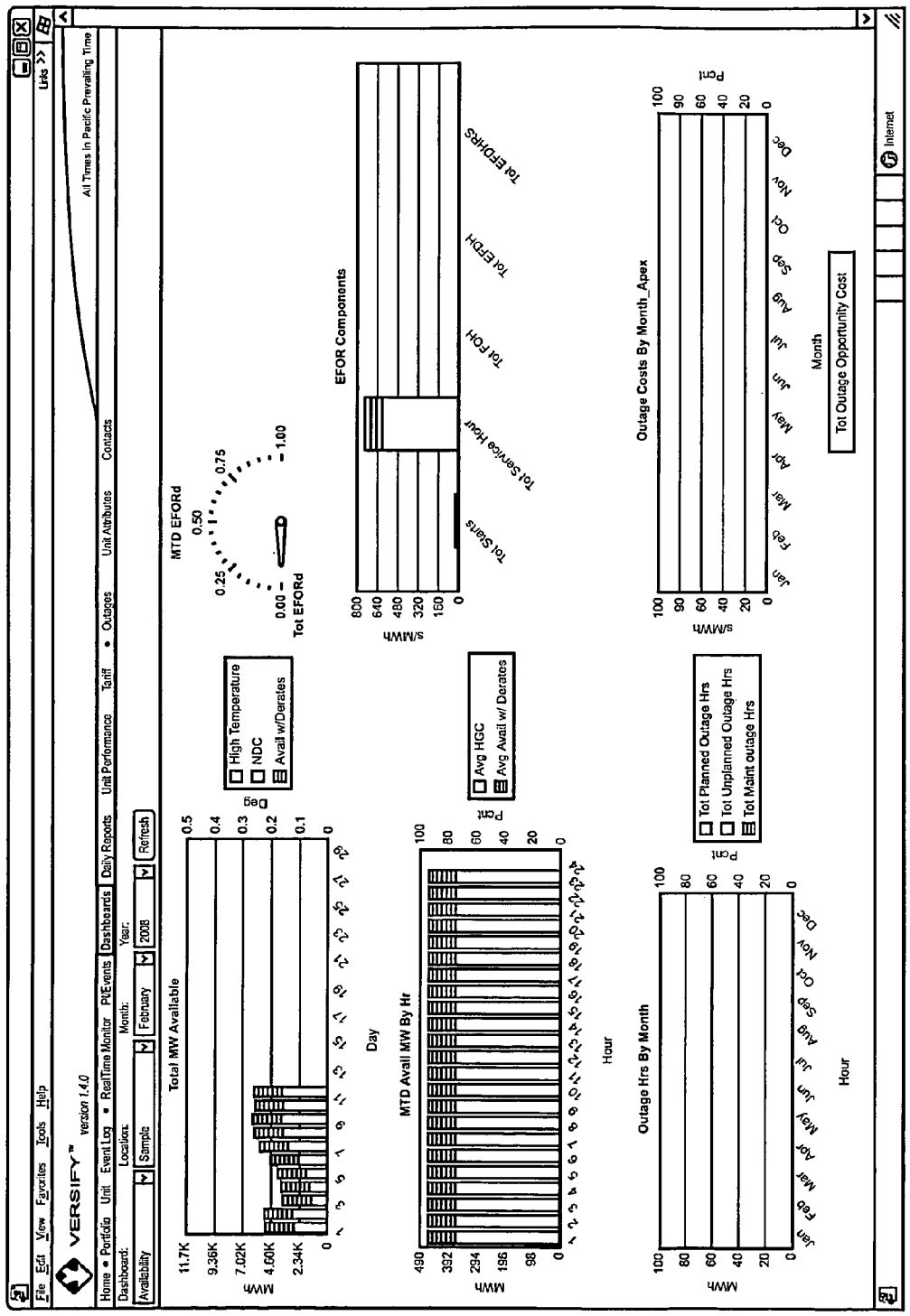
Figure 9D:
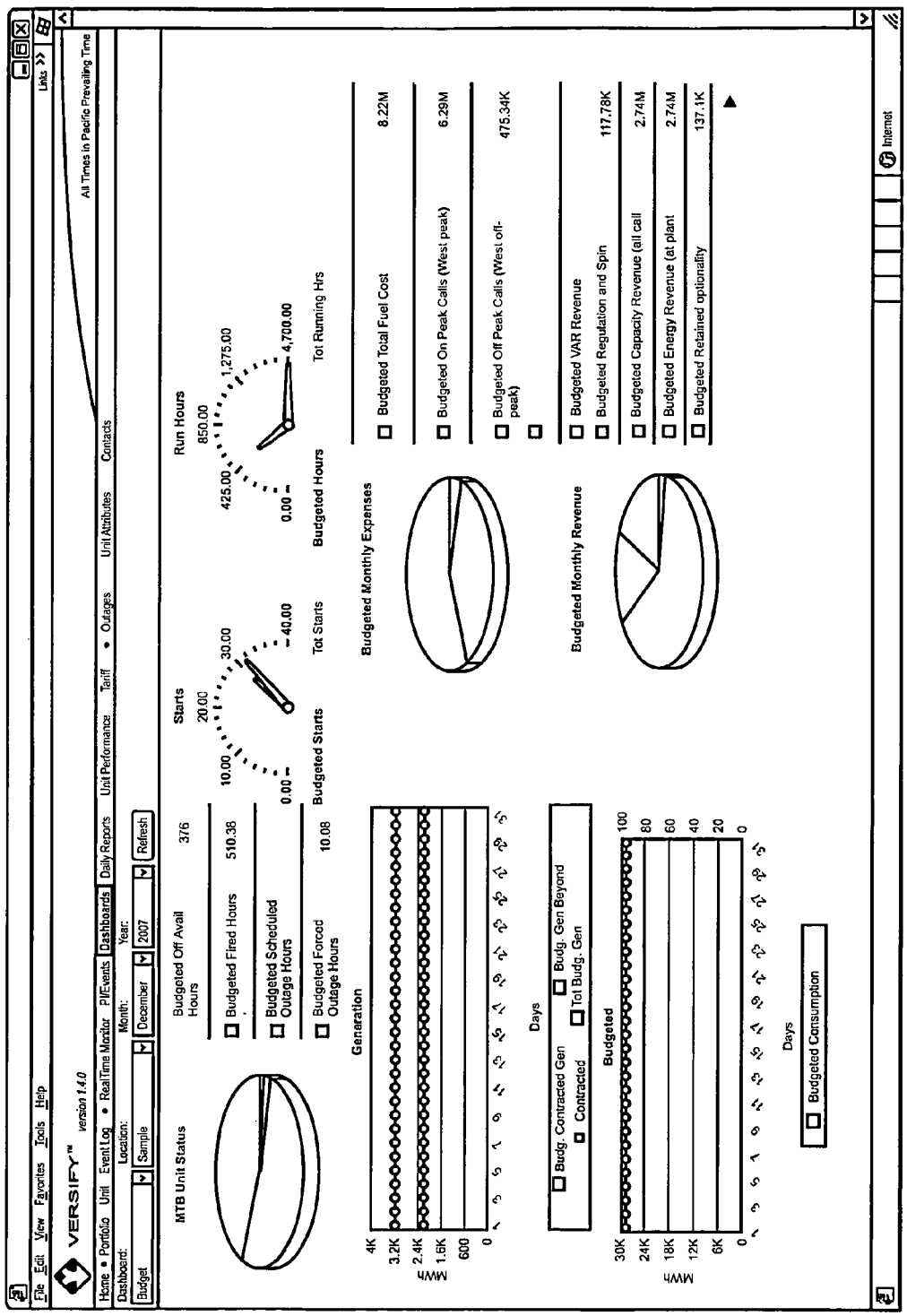
Figure 9E:
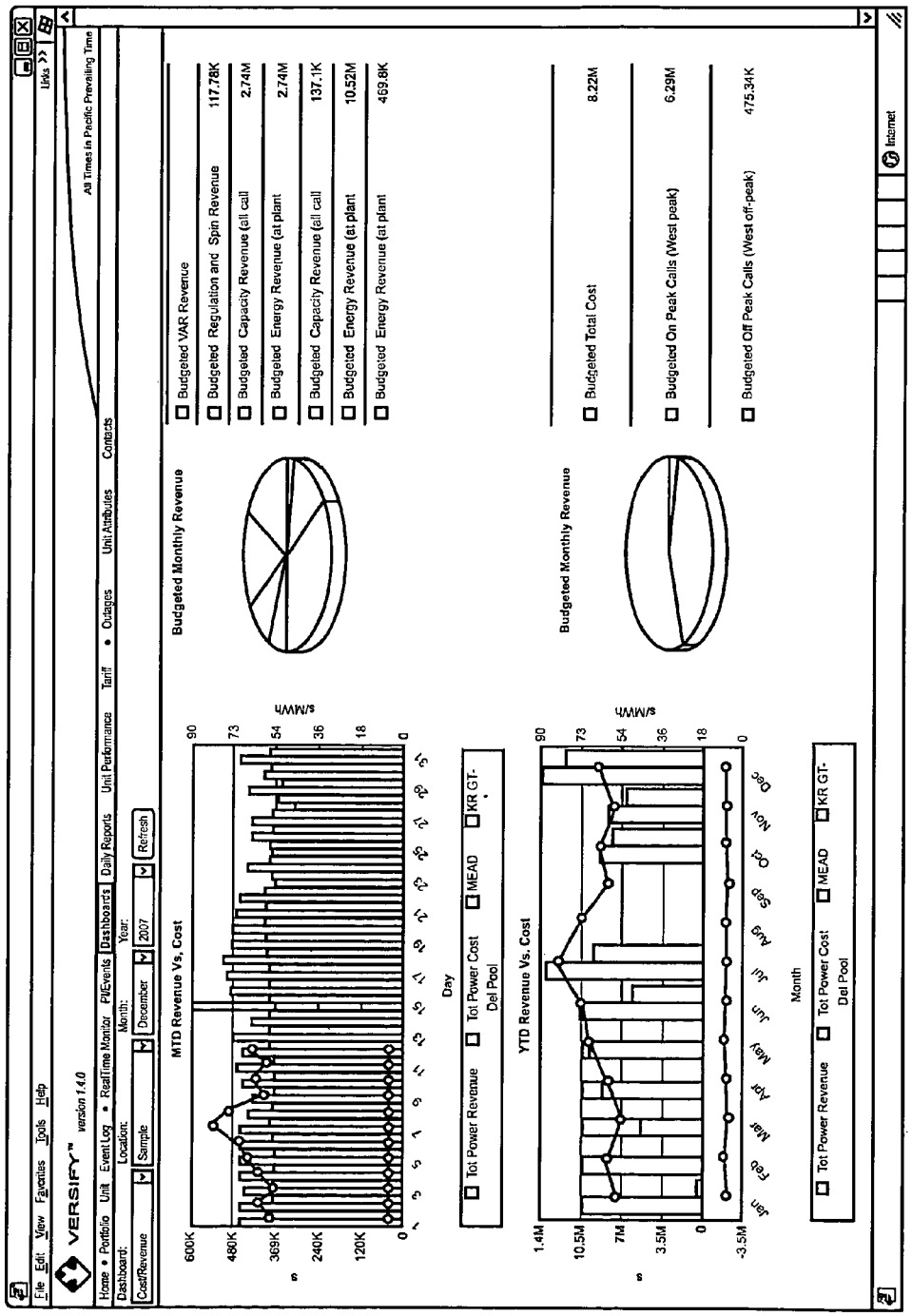
Figure 9F:
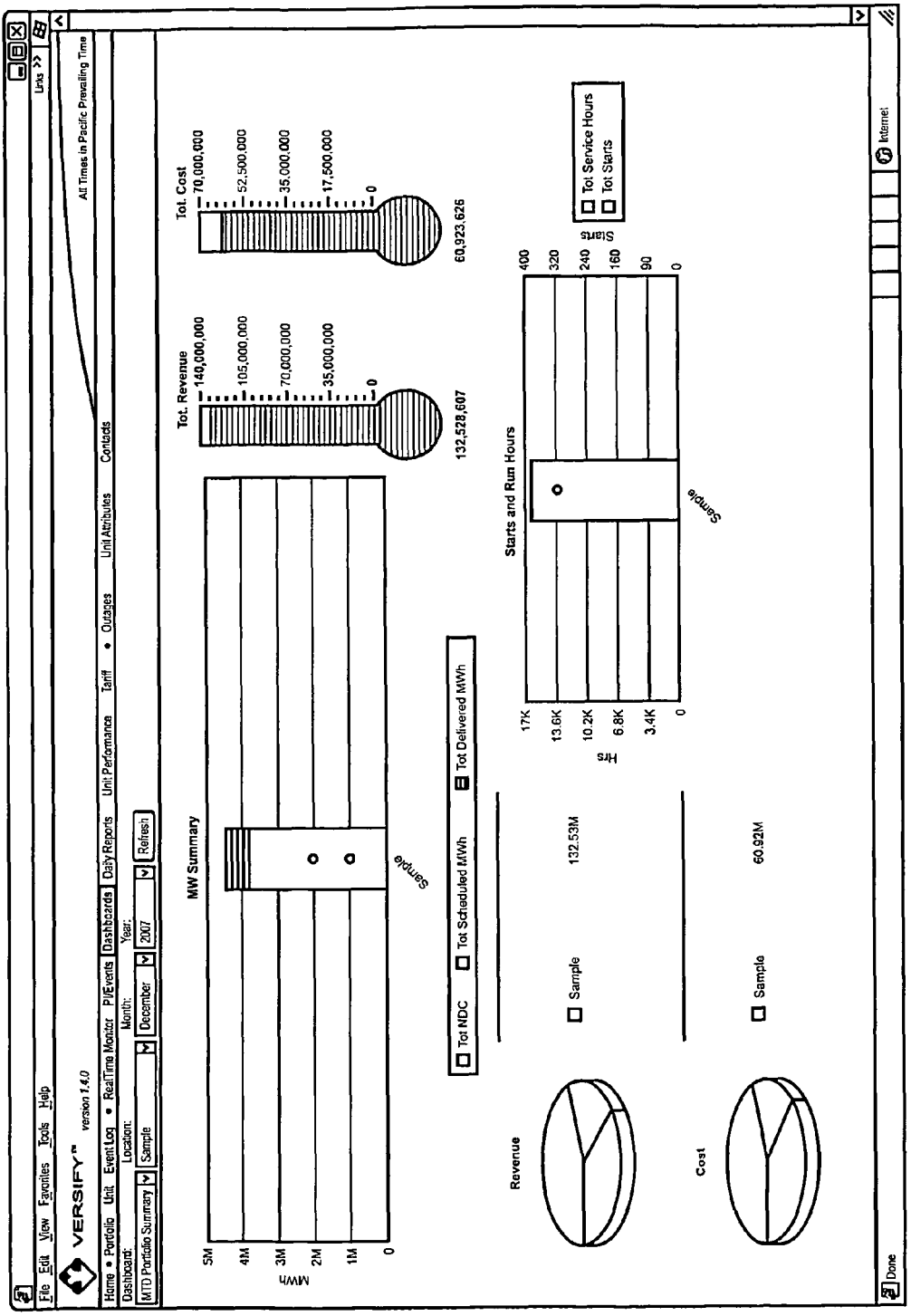
Figure 9G:
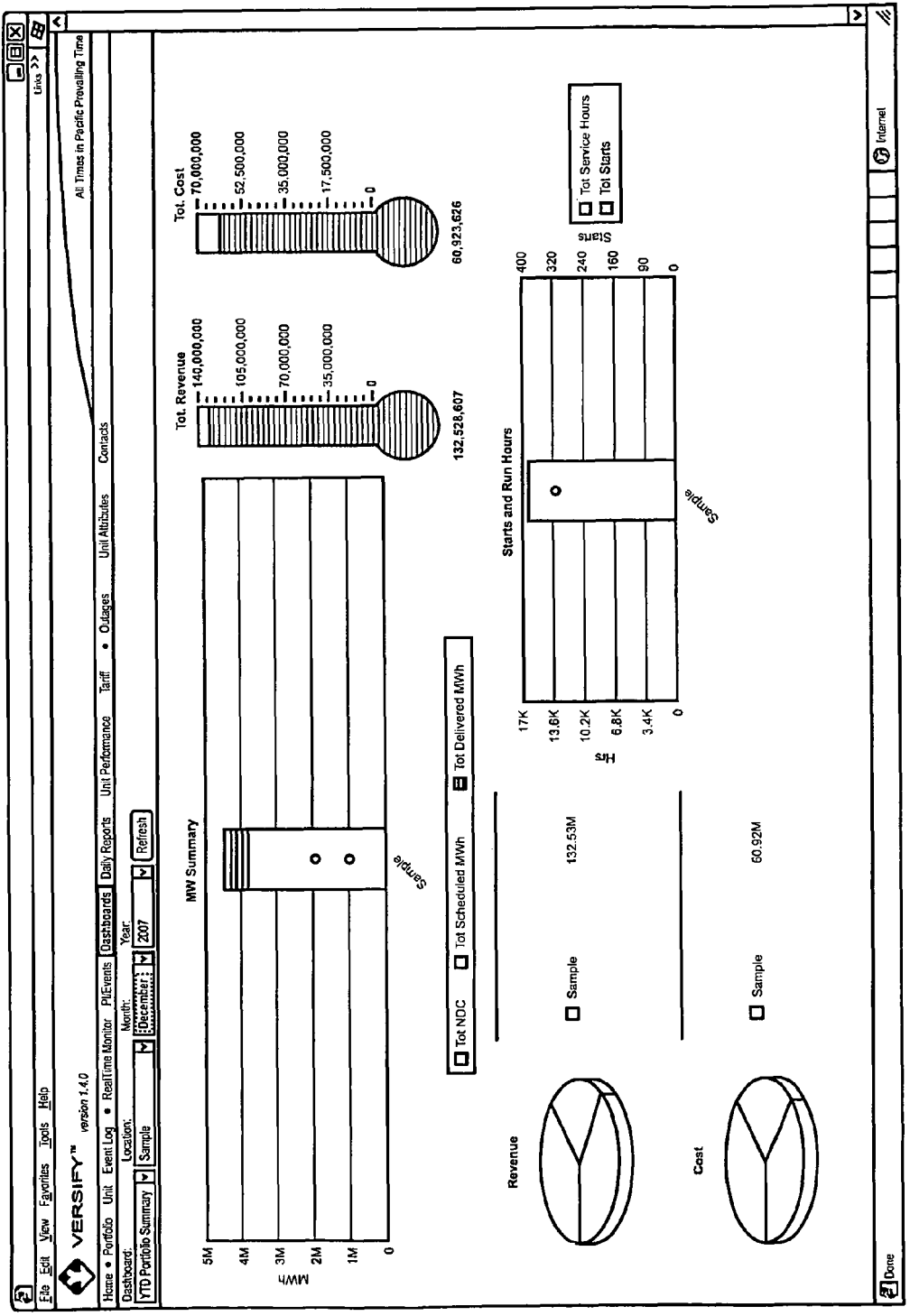
Figure 9H:
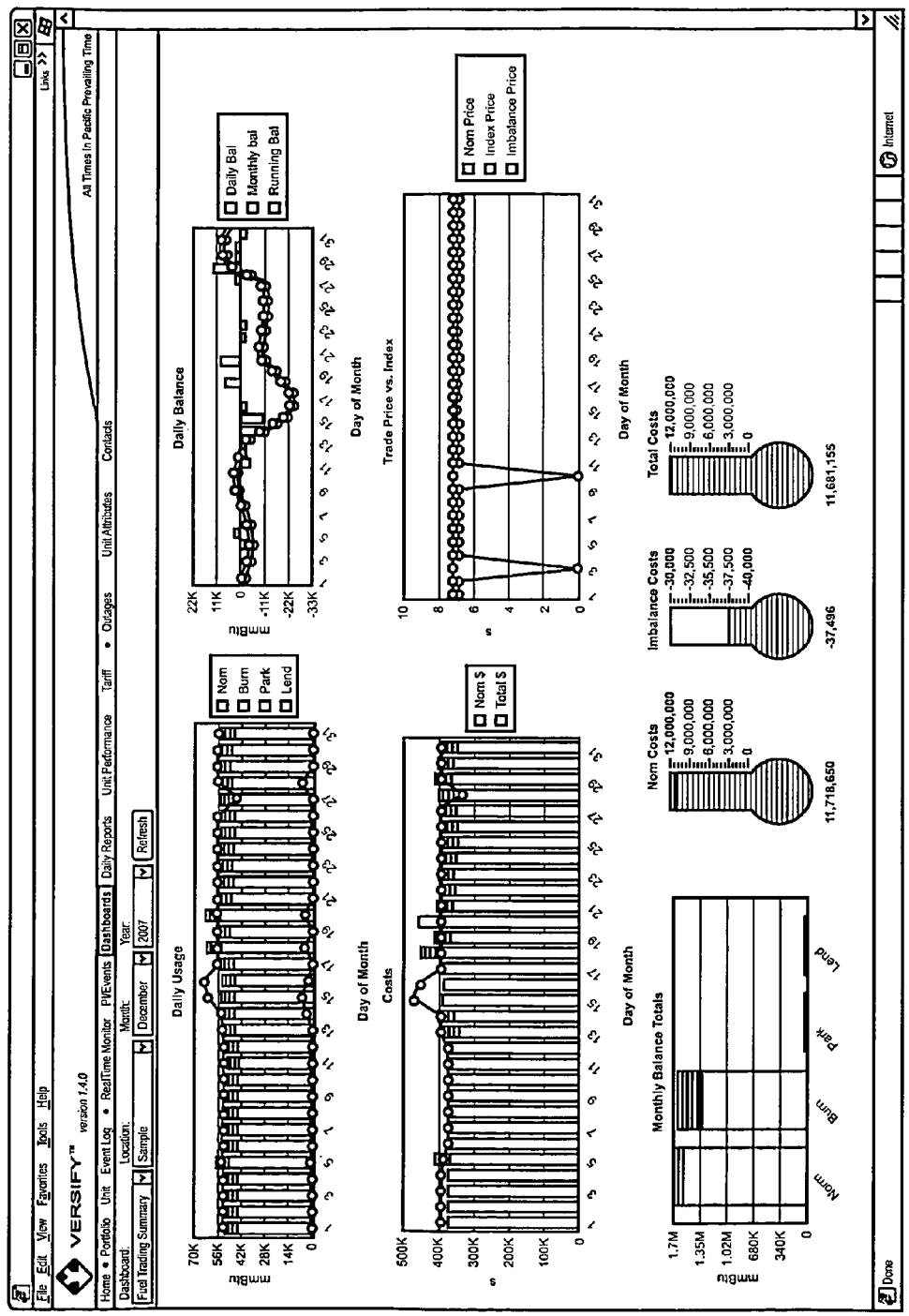
Figure 9I:
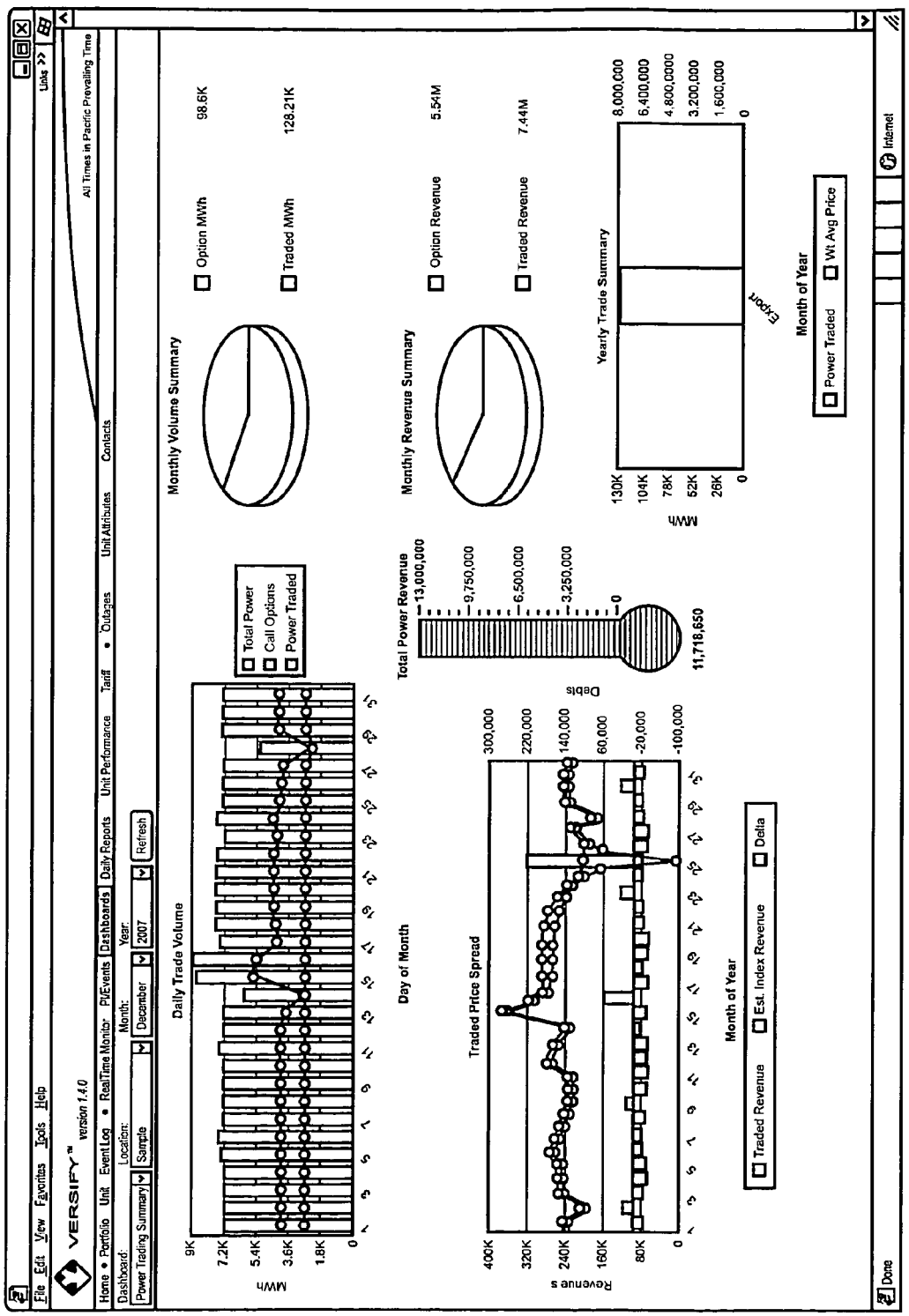
Figure 9J:
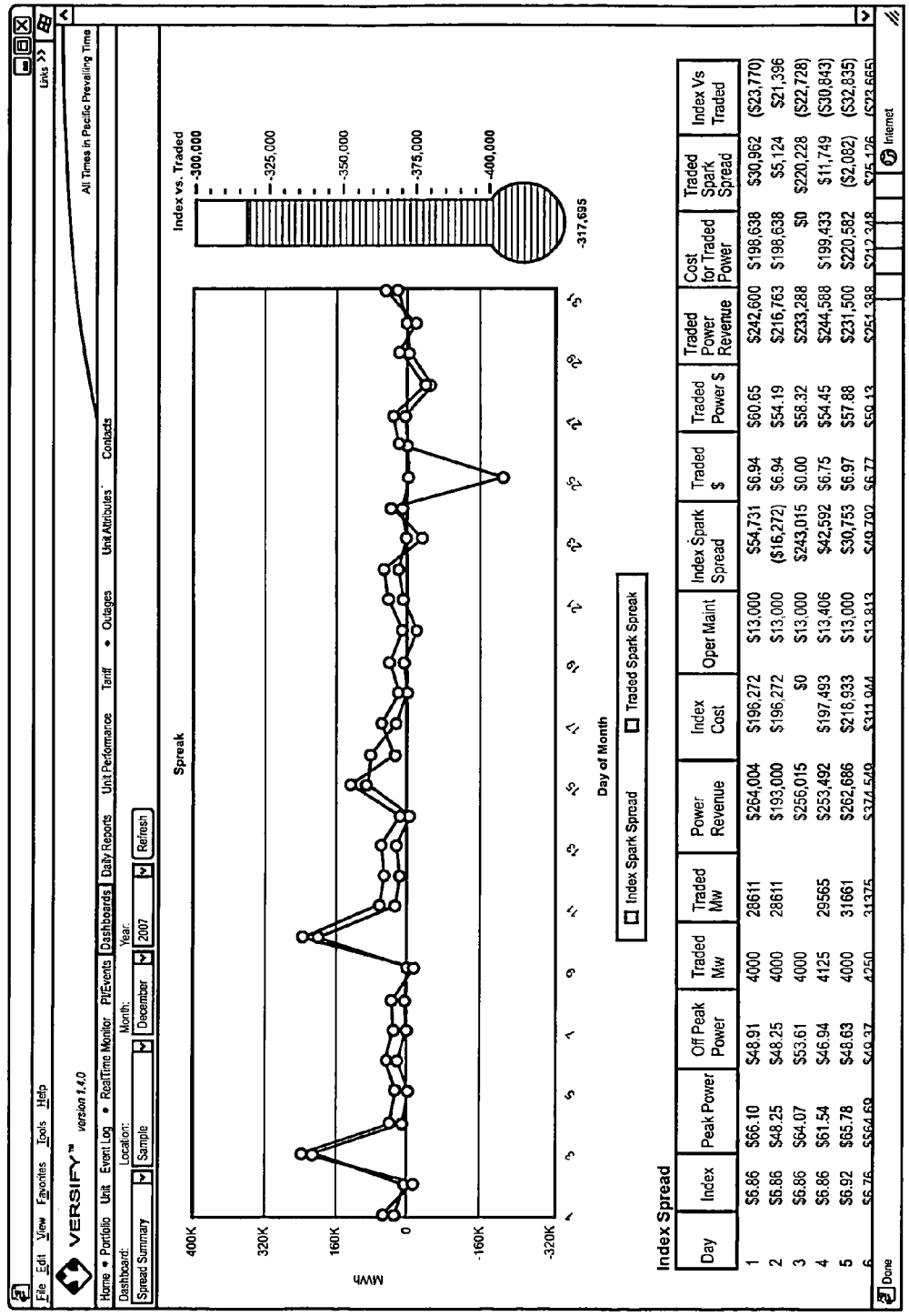
Figure 9K:
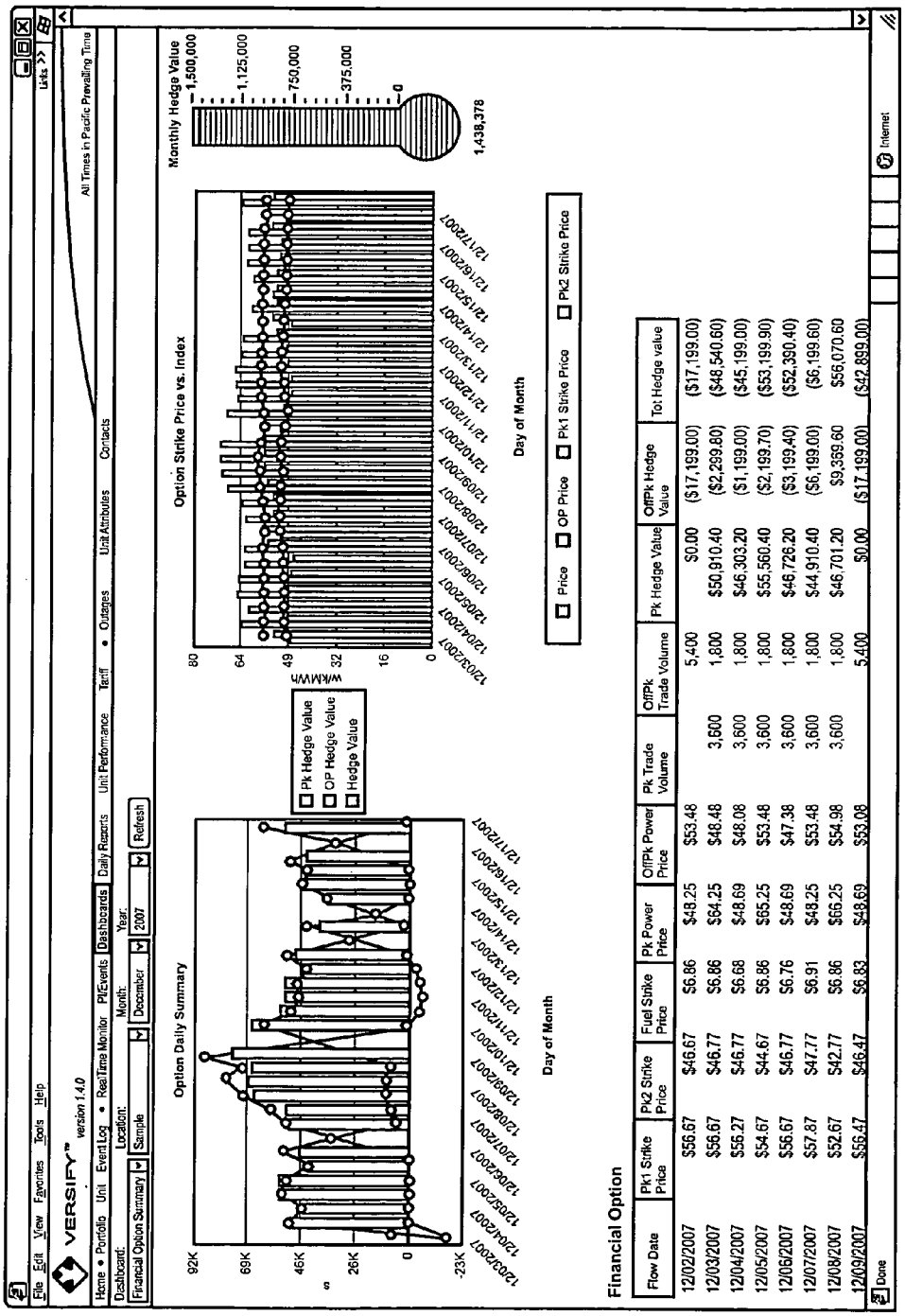
Figure 9L:
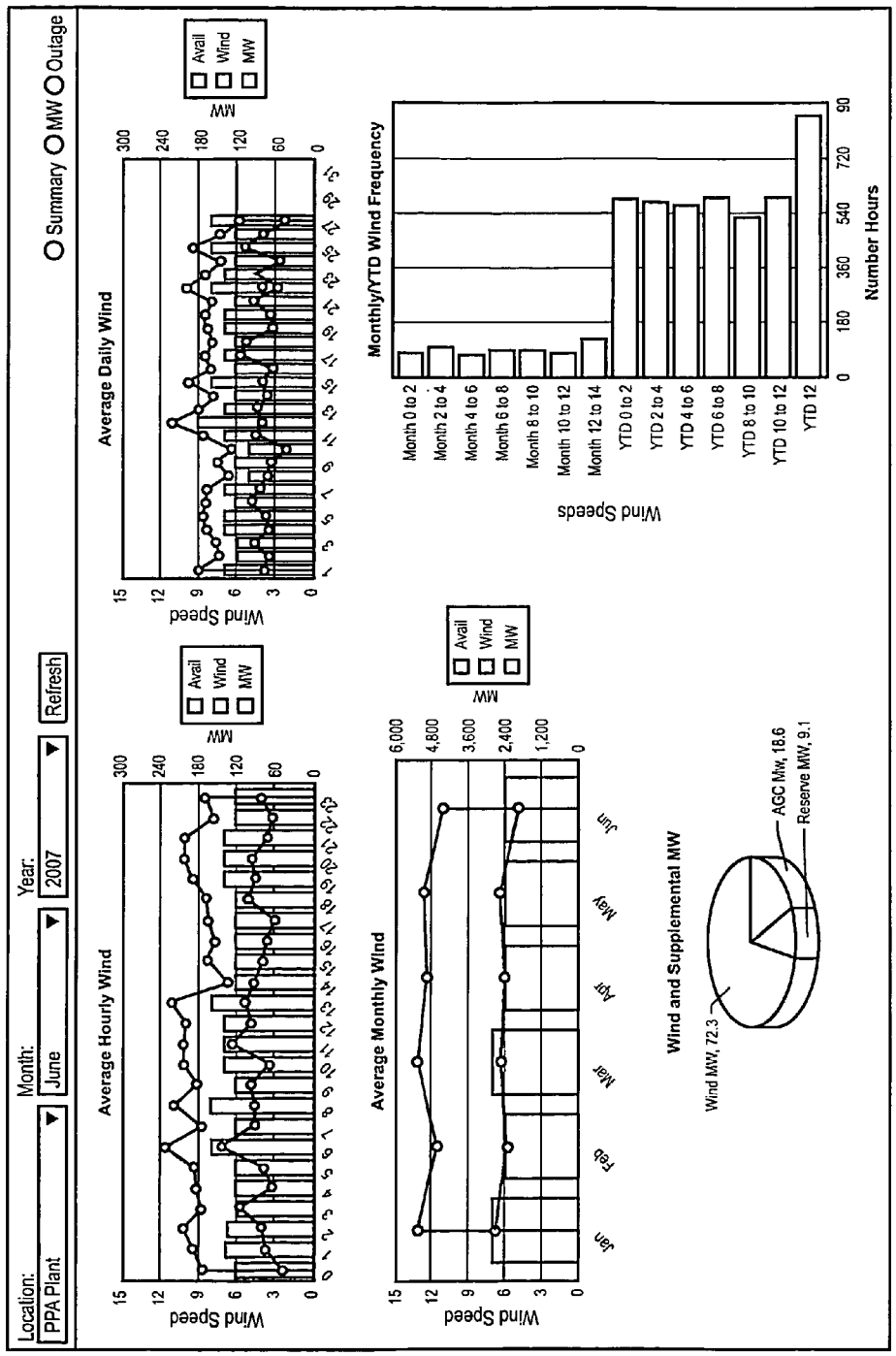

For example FIG. 9L illustrates a renewable energy power plant operations summary. FIG. 9L displays summaries of various operating parameters of a wind farm, such as meteorological conditions (e.g., wind) over a specified period and the power generated in relation to the wind events. Trends are also summarized around the renewable energy, such as wind, solar, and water. For instance, in FIG. 9L, trends regarding wind, such as average wind speeds, wind gusts at different wind levels, wind speeds at a certain time of day, and the like are tracked and summarized. In case of solar energy, for example, dashboards and reports may be provided for key parameters, such as average actual versus forecasted cloud cover and other key statistics about how solar power may be maximized. The dashboards and reports are also customized by power plant to connect the meteorological conditions to the asset performance to maximize output and efficiency. It is understood that other dashboard interfaces, such as energy scheduling 200 and energy dispatch interfaces as described above, may be included without departing from the scope of the present invention.

In the exemplary embodiment, each dashboard is run for a selected month. However, other time ranges may be used without departing from the scope of the invention. For example, the user may select a power plant (i.e., location) and a month out of a year, and refresh the report. An XML:HTTP(S) callback is made from the browser on the client device 540 to the web server 516. The web server 516 receives the XML:HTTP(S) request and creates an instance of the reporting engine 810 described above. The reporting engine 810 builds the report interface 850 as described above, which may be an HTML div with report objects in it. The div is returned to the browser on the client device 540 that initiated the XML:HTTP(S) call. The client device 540 refreshes the page on the screen with the newly created report. As shown in FIGS. 9A-9K, the dashboard interface includes a combination of report objects, such as gauges, bar graphs, line graphs, pie charts, and tables to provide an overall performance view of the selected location by integrating the qualitative and quantitative data obtained from the disparate data sources 520, converted into a common format, and stored in the data store 518. The report object may be animated as the information is provided to show movement of the various gauges, bar graphs, line graphs, pie charts, and other graphical representations.

FIGS. 10A and 10B show exemplary embodiments of the daily report interface. The daily reports page allows a user to select a configured daily report. FIGS. 10A and 10B show the Daily Summary 1000A and Trading Summary 1000B, respectively. Other daily reports may include Day Forecasted Availability and Daily Log. It is to be understood that other daily summary reports may be included without departing from the scope of the invention. For example, the user selects a power plant (i.e., location), a reporting day, and refreshes report. An XML:HTTP(S) callback is made from the browser of the client device 540 to the web server 516. The web server 516 receives the XML:HTTP(S) Request and creates an instance of the reporting engine 810 described above. The reporting engine 810 builds the report as described above, which may be an HTML div with report objects in it. The div is returned to the browser on the client device 540 that initiated the XML:HTTP(S) call. The client device 540 refreshes the page on the screen with the newly created report. The daily report interface provides a summary of daily operational and financial activities of the selected location by integrating the qualitative and quantitative data obtained from the disparate data sources 520, converted into a common format, and stored in the data store 518.

Figure 11A:
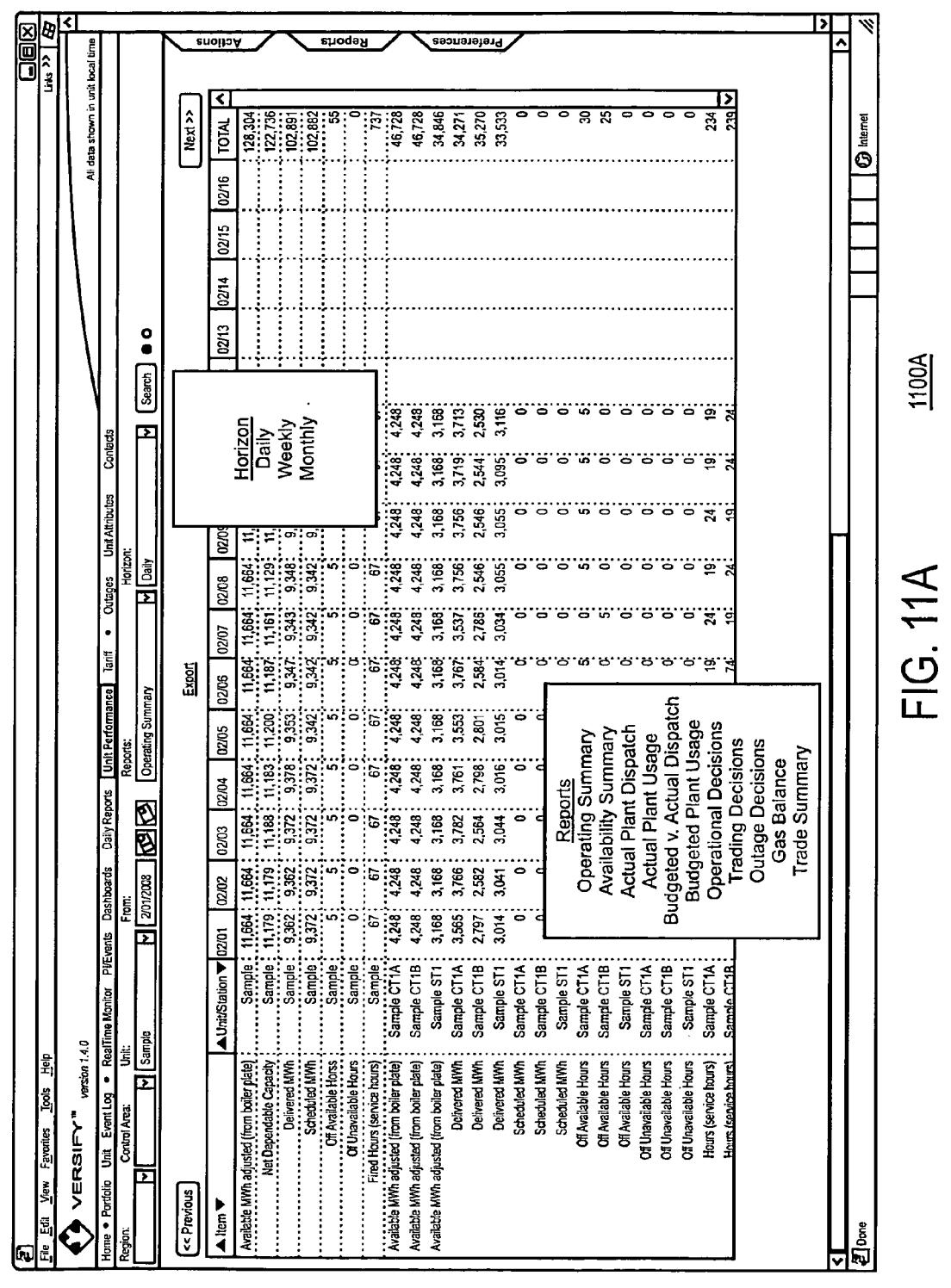
Figure 11B:
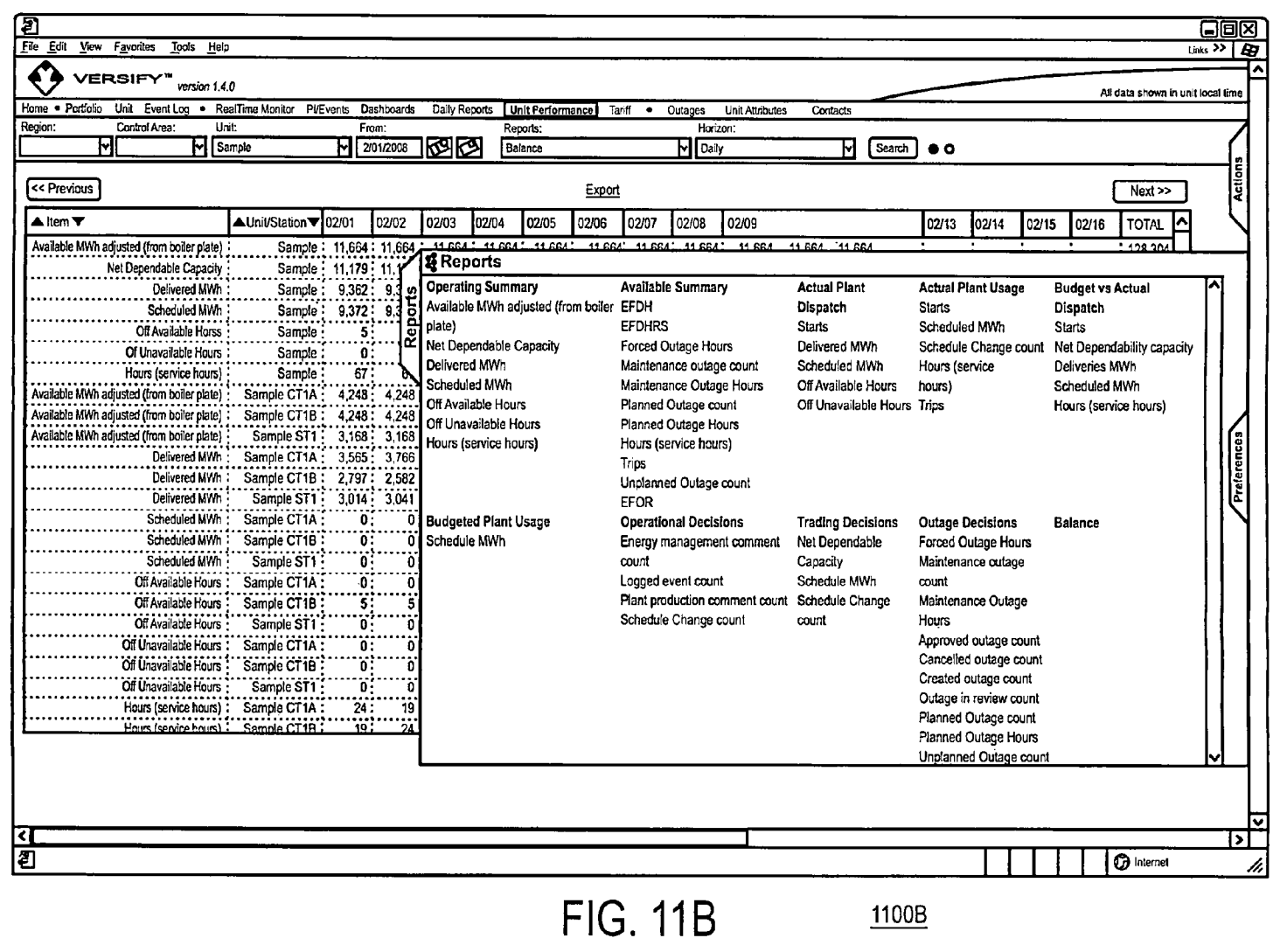

FIGS. 11A and 11B show exemplary embodiments of the unit performance report interface. The unit performance report interface includes quantitative reports for daily, weekly, and monthly time horizon, for example. In addition, the unit performance report interface includes drill down capability so that hourly detail report data may also be retrieved. In the exemplary embodiment, the unit performance report interface includes the following reports: Operating Summary, Availability Summary, Actual Plant Dispatch, Actual Plant Usage, Budgeted versus Actual Dispatch, Budged Plant Usage, Operational Decisions, Trading Decisions, Outage Decisions, Gas Balance, and Trade Summary. It is understood that other summaries may be included without departing from the scope of the invention. In the exemplary embodiment, the unit performance report interface and the items displayed are maintained in an XML fragment in the unit performance page's reports config file 830. For example, a user selects a report, a time frame, and a time horizon to initiate the report. The browser of the client device 540 initiates a callback to the web server 516, which in turn calls a stored procedure 840. The stored procedure includes logic to summarize the data to the selected level (daily, weekly, monthly). When the result set is returned to the web server 516, the page is correctly formatted with the data into a table with the correct number of columns (e.g., based on daily, weekly, or monthly) and returns the table to the browser on the client device 540. As shown in FIG. 11B, the unit performance page also includes drill down capability to drill down into a finer granularity (e.g., hourly details). Database mapping tables are used to map summary items on the main page to the hourly detail. When a user clicks on a cell on the main report, the browser on the client device 540 initiates a callback. The callback request is received by the web server 516, and a stored procedure 840 is executed to retrieve mapped detail from the data store 518. The mapped detail is returned to the client device 540 as a table, for example. The other interfaces of the present invention may also operate in the same or similar manner.

Figure 12:
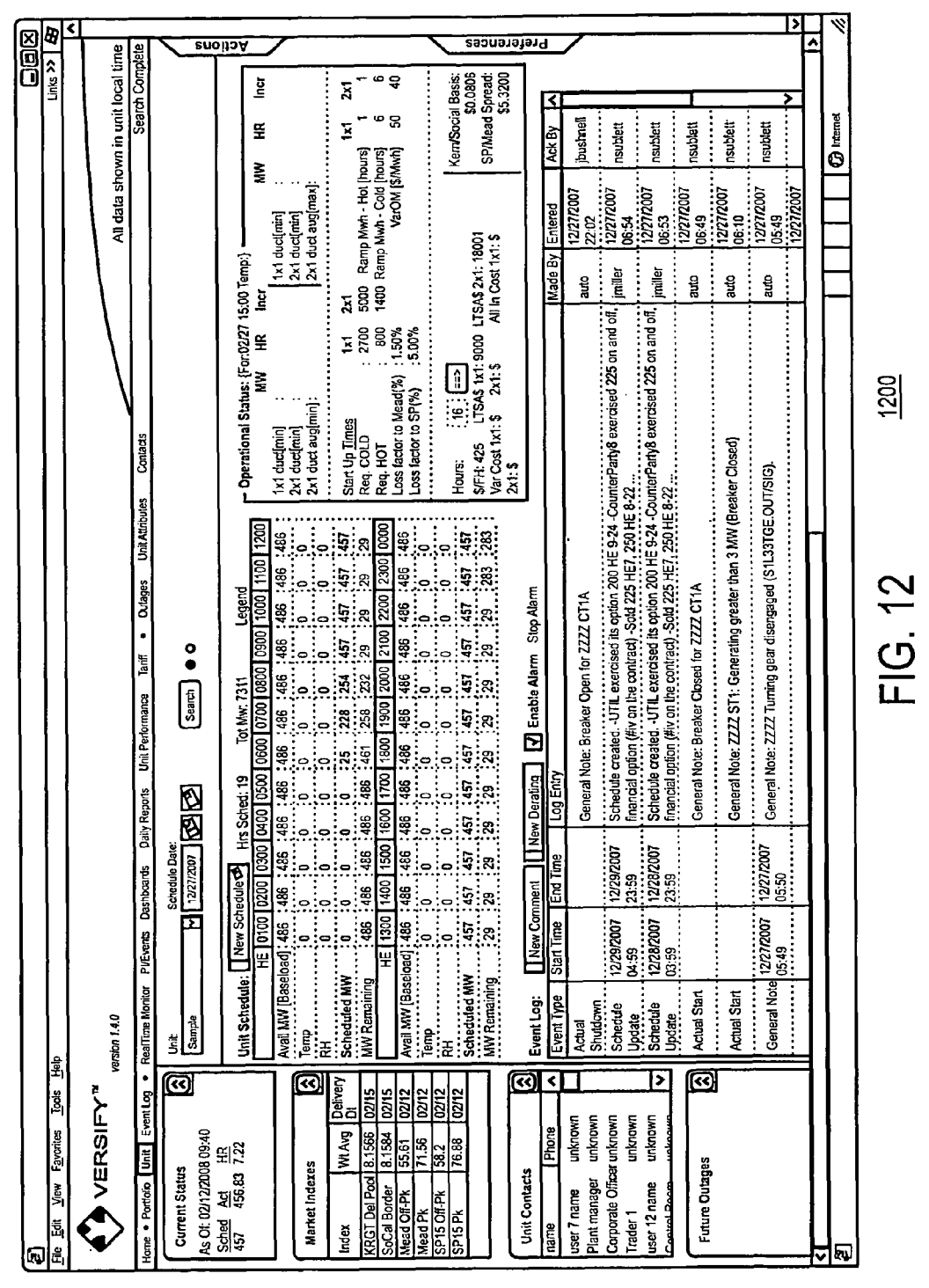

FIGS. 12-15B show exemplary embodiments of ad-hoc SCADA query interface and unit status communication interface in accordance with the present invention. For example, FIG. 12 illustrates an exemplary unit interface 1200 that displays operational information of a selected unit. The information may include current status, operational statistics, schedules, event logs for the unit, and market data. The information may be displayed for a selected date. It is to be understood that other information regarding the selected unit may be included without departing from the scope of the invention.

Figure 13:
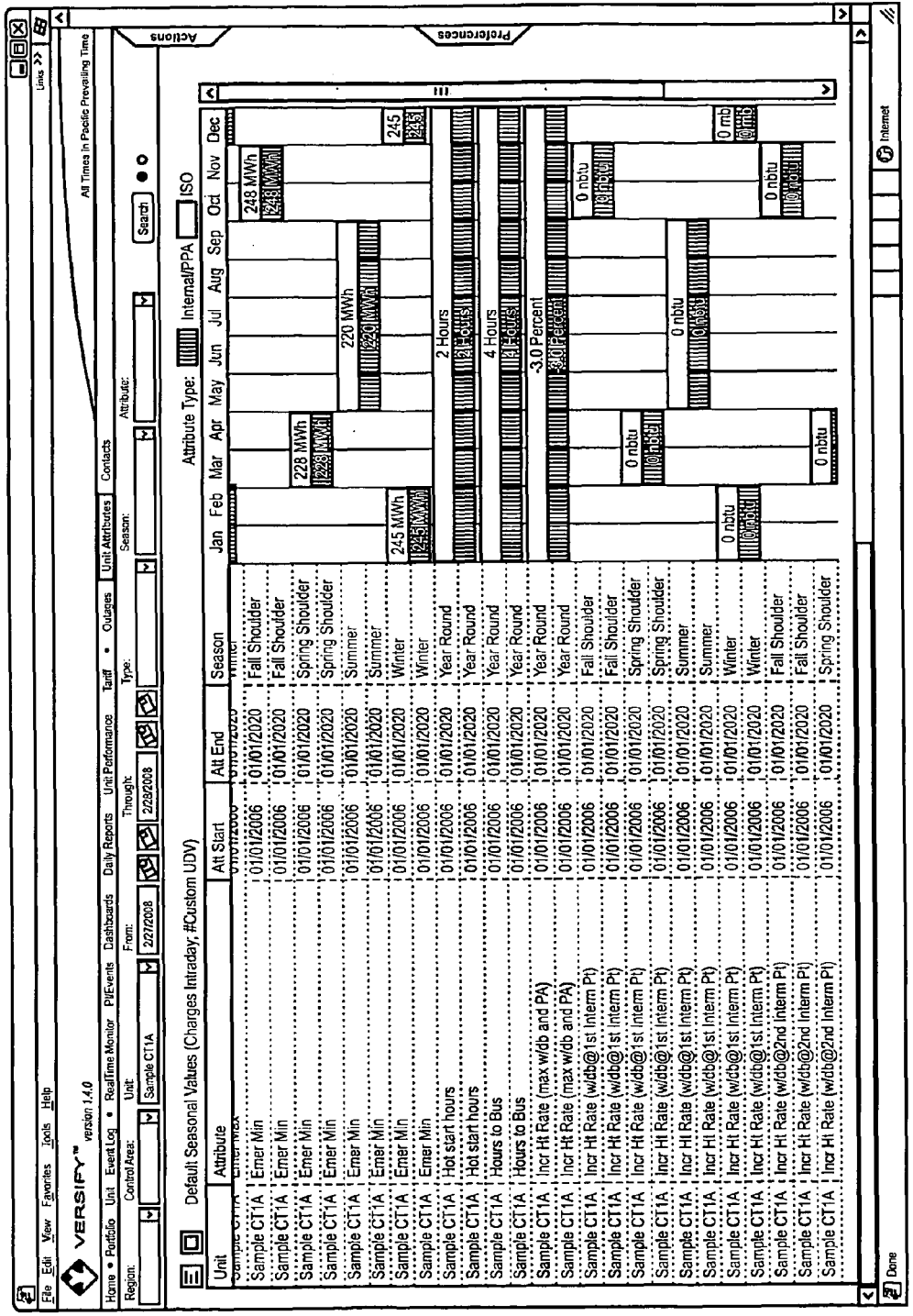
FIG. 13 illustrates an exemplary unit attribute interface in accordance with the present invention.

FIG. 13 illustrates an exemplary unit attribute interface 1300 that displays a summary of the operational attributes based on region, control area, unit, and date range, for example. Other criteria, such as type, season, and attribute may be selected for viewing.

FIG. 14 illustrates an exemplary event log interface 1400 for a selected unit. The event log may be sorted based on event type and date range, for example. In an exemplary embodiment, the event types may include, but are not limited to: Actual Shutdown, Actual Start, Derate (max cap change), General Note, Schedule Change, Schedule Test, Schedule Update, Trip (max cap change), and Workorder Impacting Operations.

Figure 15A:
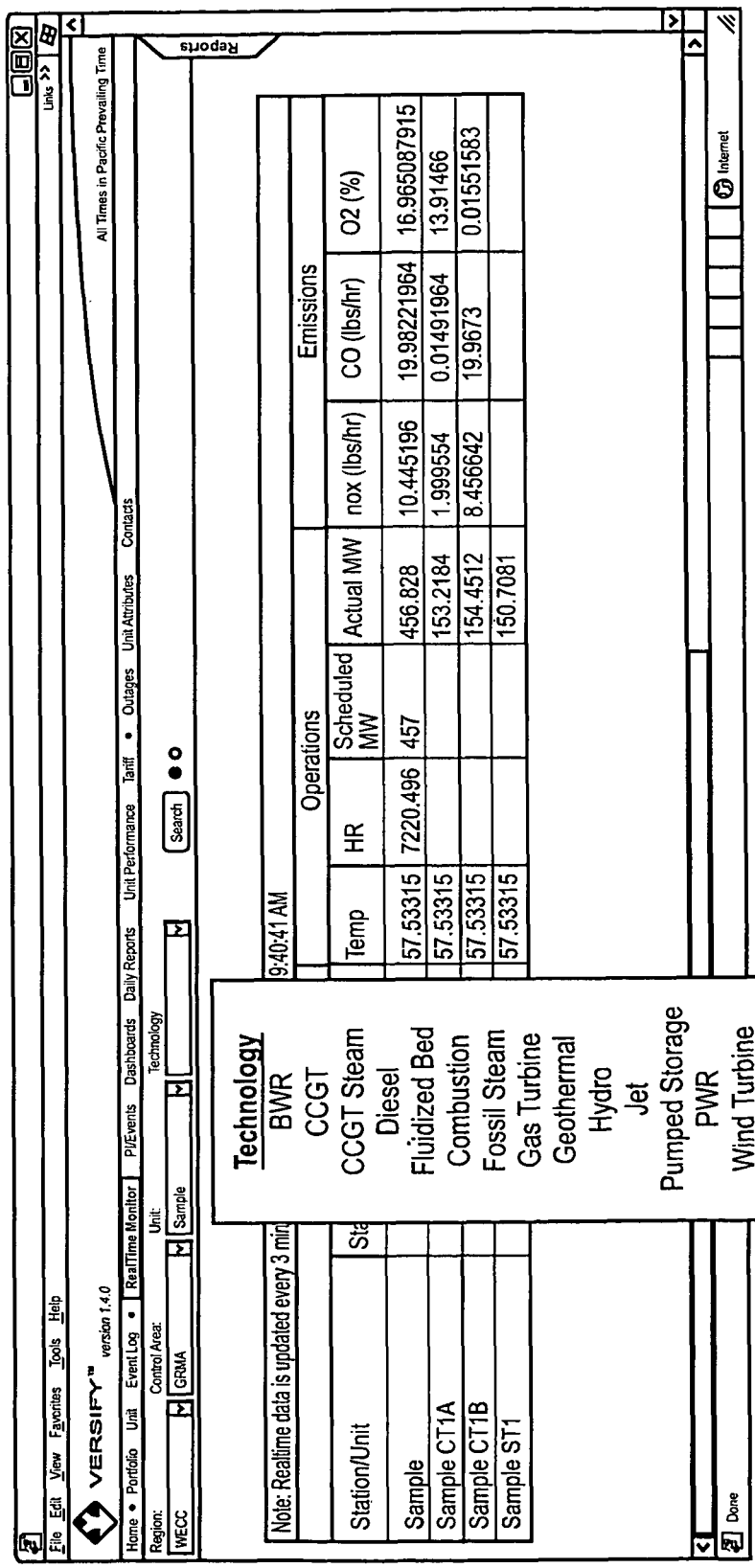
FIGS. 15A and 15B illustrate an exemplary real time monitor in accordance with the present invention.
Figure 15B:
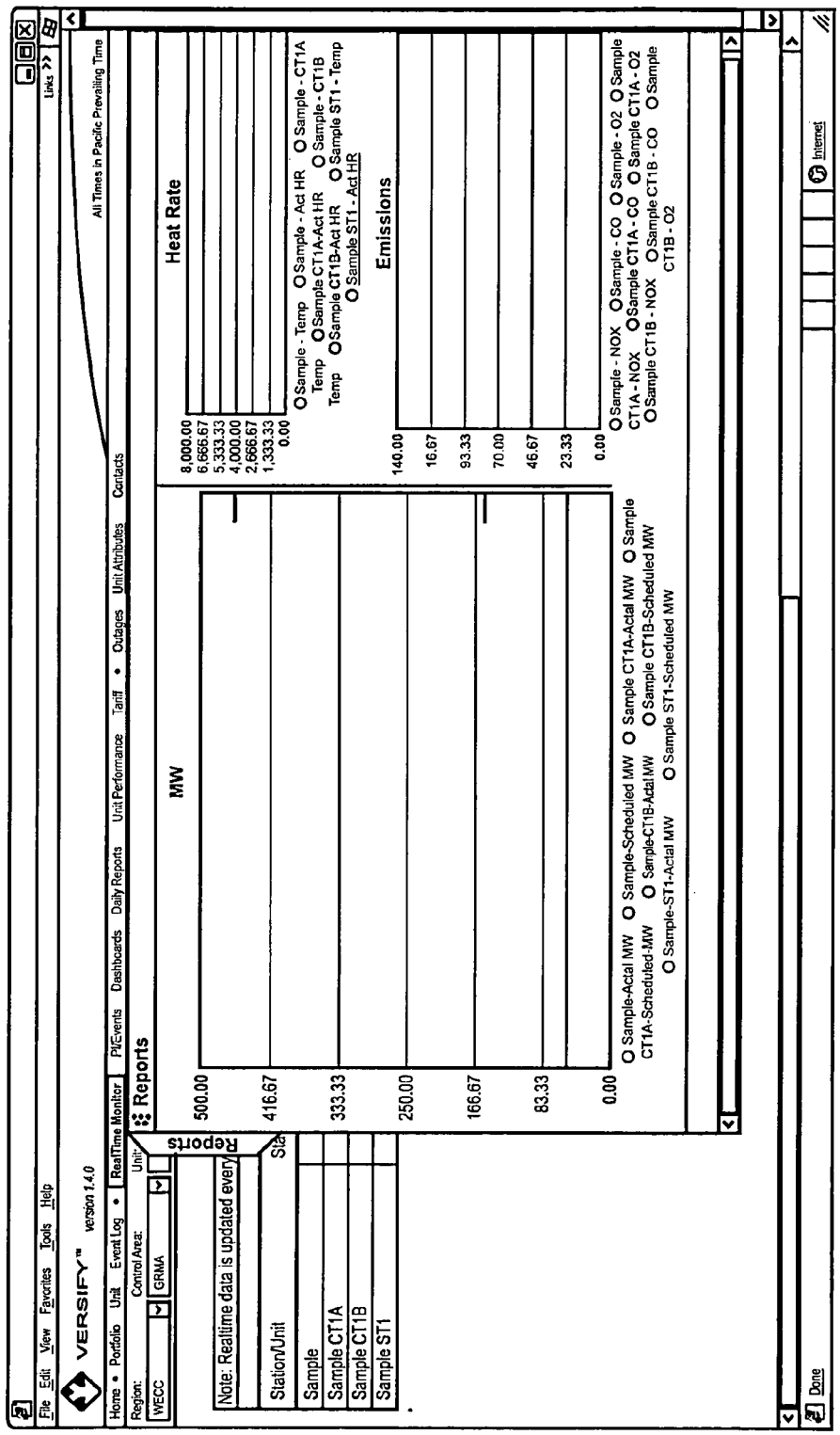

FIGS. 15A and 15B illustrate an exemplary (near) real time monitor 1500A-B for a selected unit. In an exemplary embodiment, the operational data of a hosted power plant is updated every three (3) minutes. However, the period for update may be changed without departing from the scope of the present invention. The monitor may be selected based on region, control area, unit, and technology. Technology criteria may be include, but are not limited to: BWR, CCGT Gas, CCGT Steam, Diesel, Fluidized Bed, Combustion, Fossil Steam, Gas Turbine, Geothermal, Hydro, Jet, Pumped Storage, PWR, and Wind Turbine. Other renewable energy power plant criteria, such as solar, may be included without departing from the scope of the present invention. As shown in FIG. 15B, the real time monitor 1500B includes a pull-out to provide graphical representation of the monitored parameters, such as megawatt (MW), heat rate, and emissions. Other parameters may be included without departing from the scope of the present invention.

Figure 16:
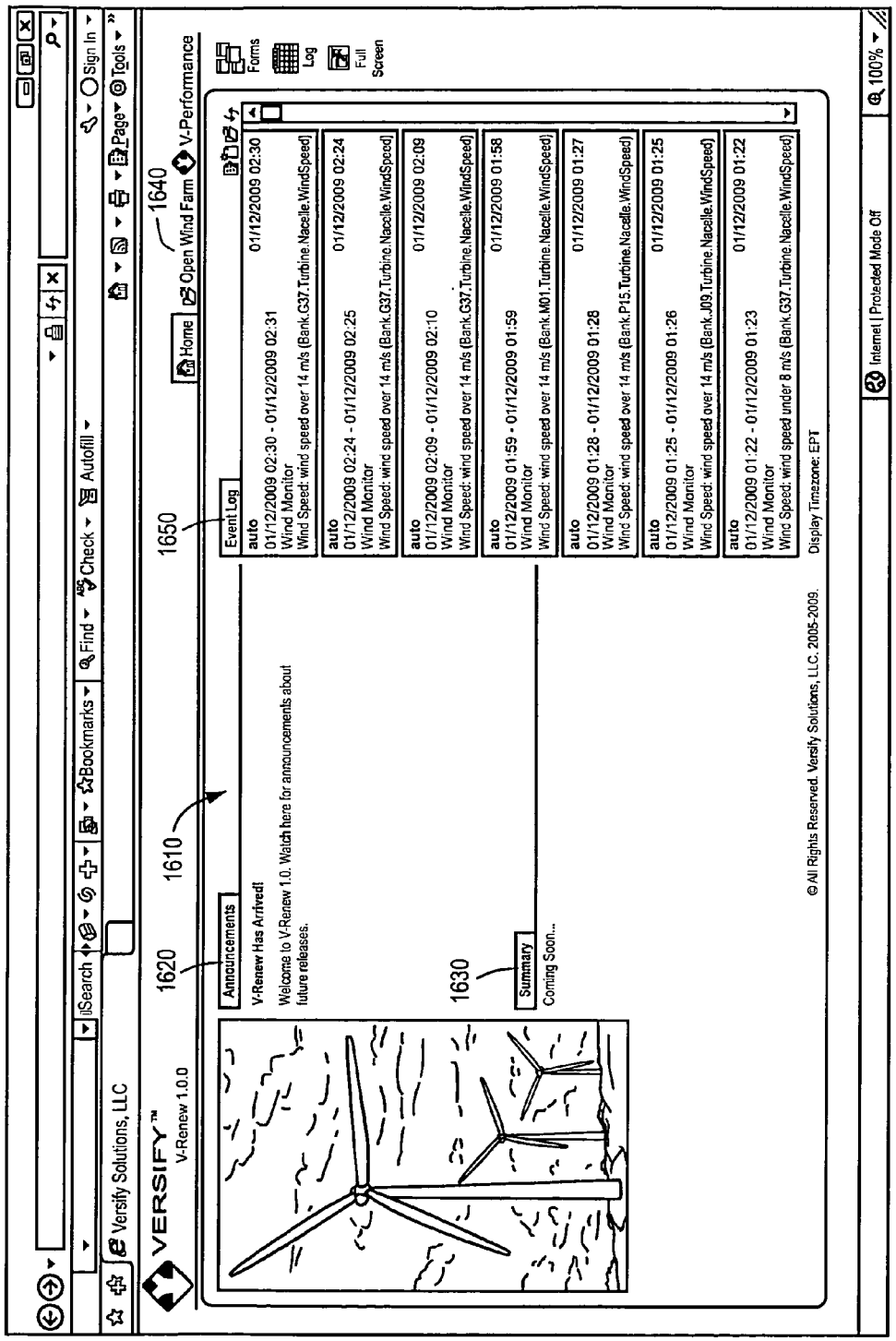
FIG. 16 illustrates an exemplary homepage with event log interface in accordance with the present invention.

FIG. 16 illustrates an exemplary homepage with event log interface 1600 in accordance with the present invention. The interface 1600 may include a homepage 1610 with an announcements module 1620, a summary module 1630, and an event log module 1650. In addition, a feature for opening a wind (or other renewable energy) farm 1640 may also be available. The homepage 1610 may be displayed upon login into the system. The announcements module 1620 may display one or more announcements that should be communicated to the user. The summary module 1630 may display a summary of any energy generation or production from one or more accessible renewable farms (e.g., wind, solar, hydro). The event log module 1650 may display the recent event dispatch log events related to one or more accessible renewable energy farms. Log events may include, but are not limited to, alarms regarding wind speed, direction, and MW generation.

FIG. 17 illustrates an exemplary renewable energy plant monitoring interface 1700 in accordance with the present invention. The interface 1700 may include a feature for zooming in/out 1710 on a map illustrating wind (or other renewable energy) turbines, icons 1720 (or other text/graphical representations) on the map corresponding to wind turbines, operational statistics 1740 related to the wind farm and its individual turbines, an event log 1750, and a menu 1730 of various report types and a status feature. The interface 1700 may be highly customized and supports the placement of various components and features on the interface, in the form of user controls. The screen layout of the interface 1700 may be defined through XML configuration files. The map illustrated on the interface 1700 may utilize a third party map server such as those provided by Microsoft® (e.g., Virtual Earth) and Google® (e.g., Earth), and may also utilize a non-third party hosted map server that serves map files. The icons 1720 may be mapped to physical locations on the map, where the physical locations may correspond to set of latitude and longitude coordinates, and an icon may represent a wind turbine (or a solar panel, hydro-generator, or other renewable energy source). Other icons representing different renewable power plant components may be displayed on the map without departing from the scope of the present invention. The icons 1720 may also be associated with one or more map-types (e.g., road, aerial, hybrid) and may appear the same or different at various zoom levels that may be adjusted using the feature for zooming in/out 1710. For example, various icons 1720 may be placed on maps at various layers that may correspond to a zoom level. The icons 1720 may present, for example, the wind speed and direction of a wind turbine, and the megawatts generated. Other data regarding renewable energy sources may also be presented through icons 1720 without departing from the scope of the invention. Such data may include, for example, weather forecasting (e.g., temperature, cloud covering, humidity, heat index, visibility, etc.) or other meteorologically-related data. The icons 1720 maybe represented through, for example, a graphic of a label, a circle, and an arrow. The label may identify the name of the corresponding wind turbine (or other renewable energy source). The circle may display data such as wind speed (e.g., 5.6 rotations per second) or energy generated (e.g., 100 kilowatts, KW). The arrow may represent the wind direction and may be rendered to display the wind direction based on anemometer readings taken from the top of a wind turbine. The look and feel of the icons 1720 (e.g., color coding, blink rate) may change dynamically based on such conditions as, for example, turbine availability, wind conditions, lack of solar light, decrease in moving water, and other renewable energy-related conditions. The icons 1720 may be updated to represent on the map the present or last state of the conditions. The icons 1720 may be updated randomly, at a fixed rate, or according to a change in the state of the conditions. In addition, as illustrated in FIG. 18, additional information may be illustrated through a turbine drill-down feature 1830, which may be invoked upon the user clicking on a specific turbine. Such information may include whether the turbine is available, the energy being generated (e.g., KW or MW), the wind direction, the wind speed, and other turbine-related information.

The operational statistics 1740 related to the wind farm and its individual turbines may display such information as, for example, the wind turbine (or other renewable energy source) identification, the amount of energy generated, and the wind speed (e.g., rotations per second). Other information available may be displayed by the operational statistics 1740 without departing from the scope of the invention. The event log 1750 may display such information as, for example, wind speed exceeding a threshold, wind speed increasing or decreasing by a specific amount in a time interval, and manually-logged renewable energy source events. The event log 1750 may display events automatically-generated or manually-generated. Automatically-generated events may be displayed to all users with access to the renewable energy source, whereas manually-generated events may be displayed to only those users within the organization that were responsible for logging the renewable energy source event.

FIG. 18 illustrates an exemplary renewable energy plant monitoring interface with a turbine drill-down interface in accordance with the present invention. The interface 1800 may include a feature for zooming in/out 1810 on a map illustrating wind (or other renewable energy) turbines, icons 1820 (or other text/graphical representations) on the map corresponding to wind turbines, operational statistics 1840 related to the wind farm and its individual turbines, an event log 1850, and a turbine drill-down feature 1830 of various report types and a status feature (described above). Features 1810-1820 and 1840-1850 operate in the same manner as features 1710-1720 and 1740-1750, respectively.

Figure 19:
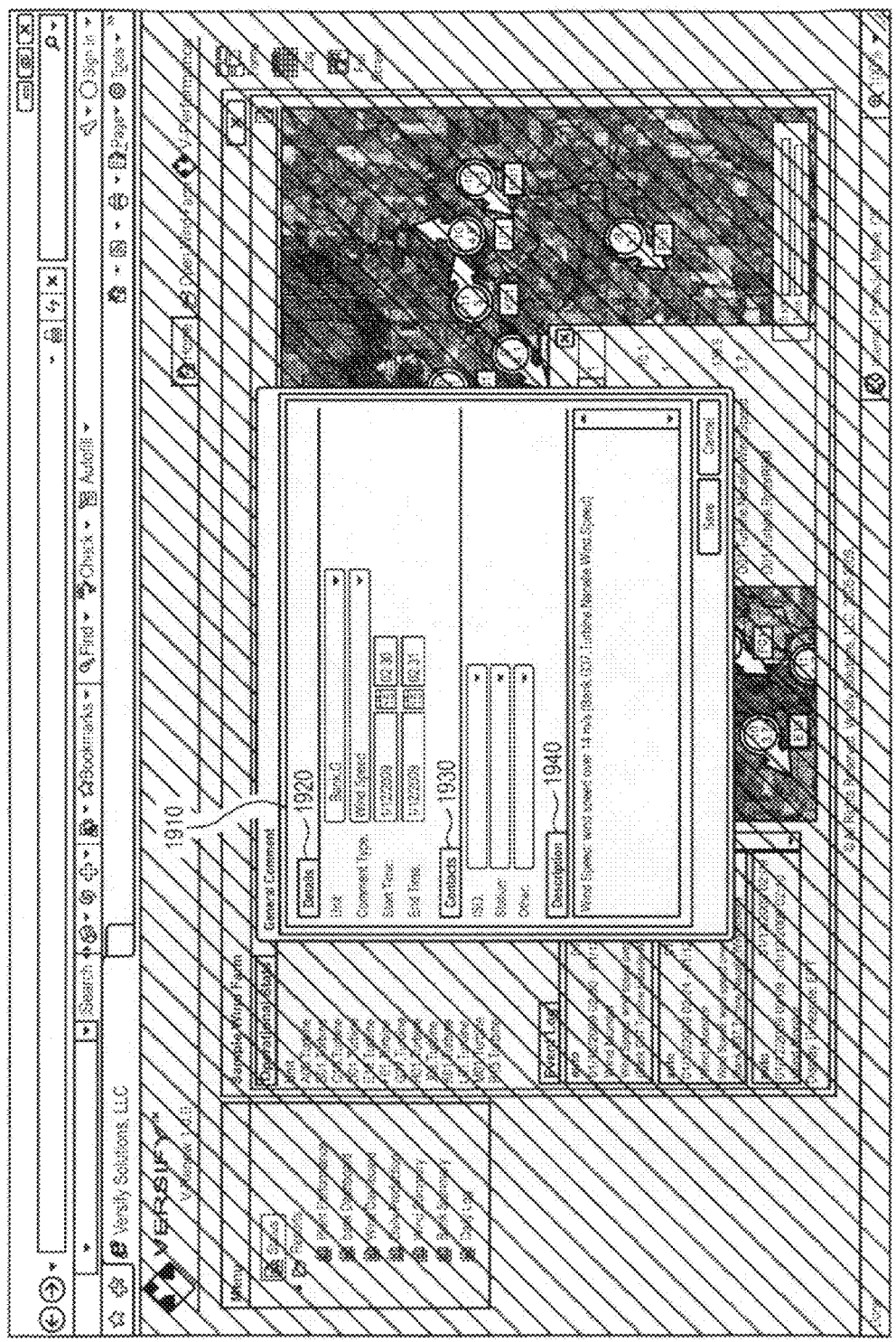
FIG. 19 illustrates an exemplary renewable energy plant monitoring interface with an event dispatch pop-up interface in accordance with the present invention.

FIG. 19 illustrates an exemplary renewable energy plant monitoring interface 1900 with an event dispatch pop-up interface 1910 in accordance with the present invention. The event dispatch pop-up interface 1910 may appear overlaying the interface 1900. The graphical user interface window event (e.g., as present in the libraries of object-oriented programming languages like Java®) for overlaying the pop-up interface 1910 on the interface 1900 may occur when, for example, an event occurs of the type which may appear in the event log 1750. The pop-up interface 1910 may include a details component 1920, a contacts component 1930, and a description component 1940. The details component 1920 may include a unit identifying the affected turbine, a comment (e.g., wind speed), and a start dateitime and end date/time associated with the event. The contacts component 1930 may include an ISO identifier, a station identifier, and an other identifier. The description component 1940 may include, for example, a summary of the event (e.g., wind speed of a specific turbine exceeds the threshold) being reported by the pop-up interface 1910.

Figure 20:
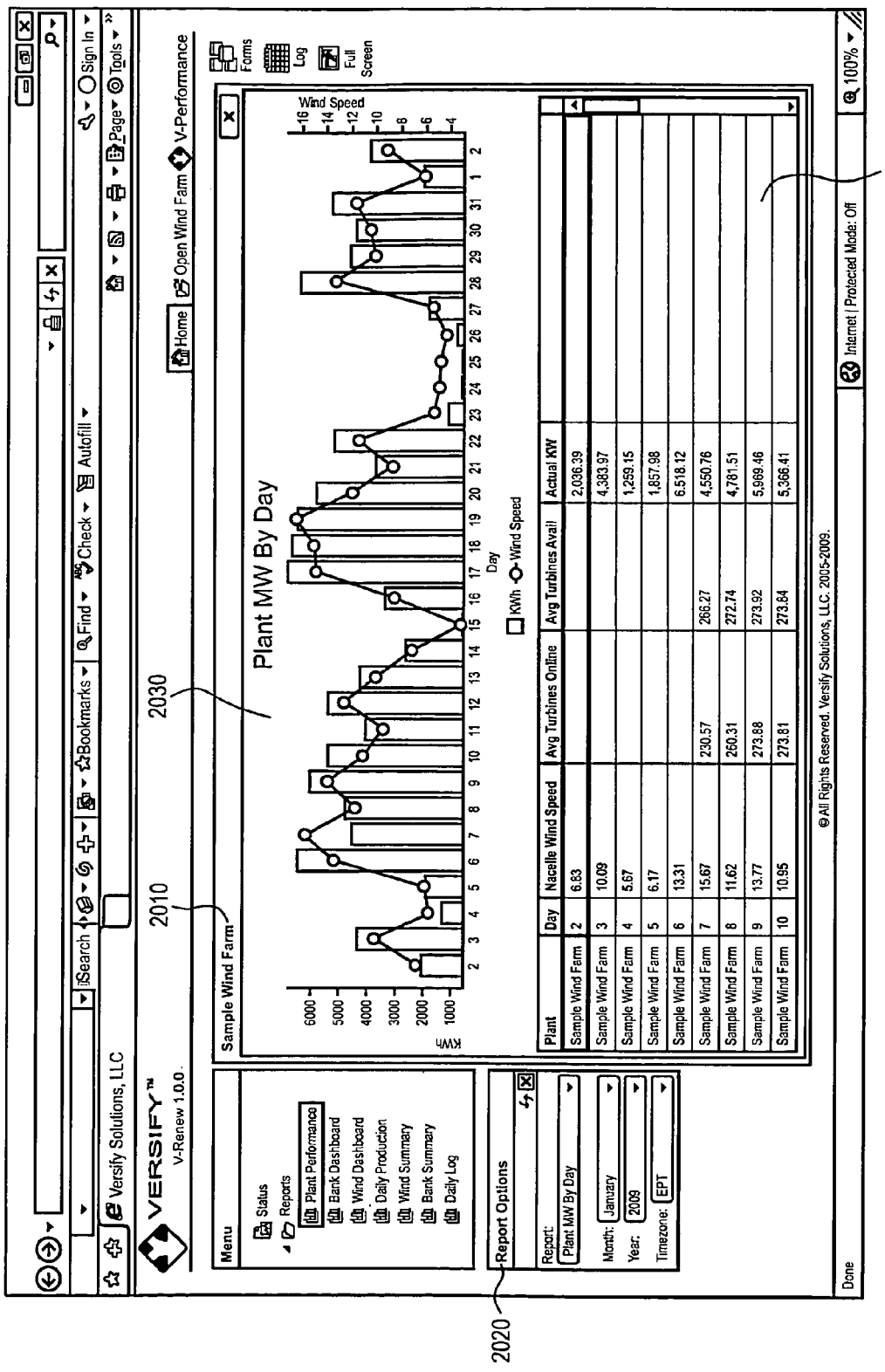
FIG. 20 illustrates an exemplary plant renewable energy generation summary report interface in accordance with the present invention.

FIG. 20 illustrates an exemplary plant renewable energy generation summary report interface 2000 in accordance with the present invention. The interface 2000 may include detailed statistics in numerical table 2040 and graph 2030 format for a renewable energy source plant (e.g., wind farm) report 2010. The statistics may in a graph 2030 include, for example, the KW hours generated for a specific time interval (e.g., an hour, day, week, month, year) at specific renewable energy source metrics (e.g., wind speed). The statistics may in a table 2040 include, for example, a plant identifier, the specific time interval, the wind speed (or other renewable energy source metric), the average renewable energy sources (e.g., turbines) available/online, and the actual KW hours generated. The interface 2000 may further include report options 2020 that may be used to customize the report type (e.g., plant MW by day) and the timeframe (e.g., day, month, year, timezone) during which the graph 2030 and table 2040 data should be analyzed for the report 2010. Other report options may be used without departing from the scope of the present invention.

Figure 21:
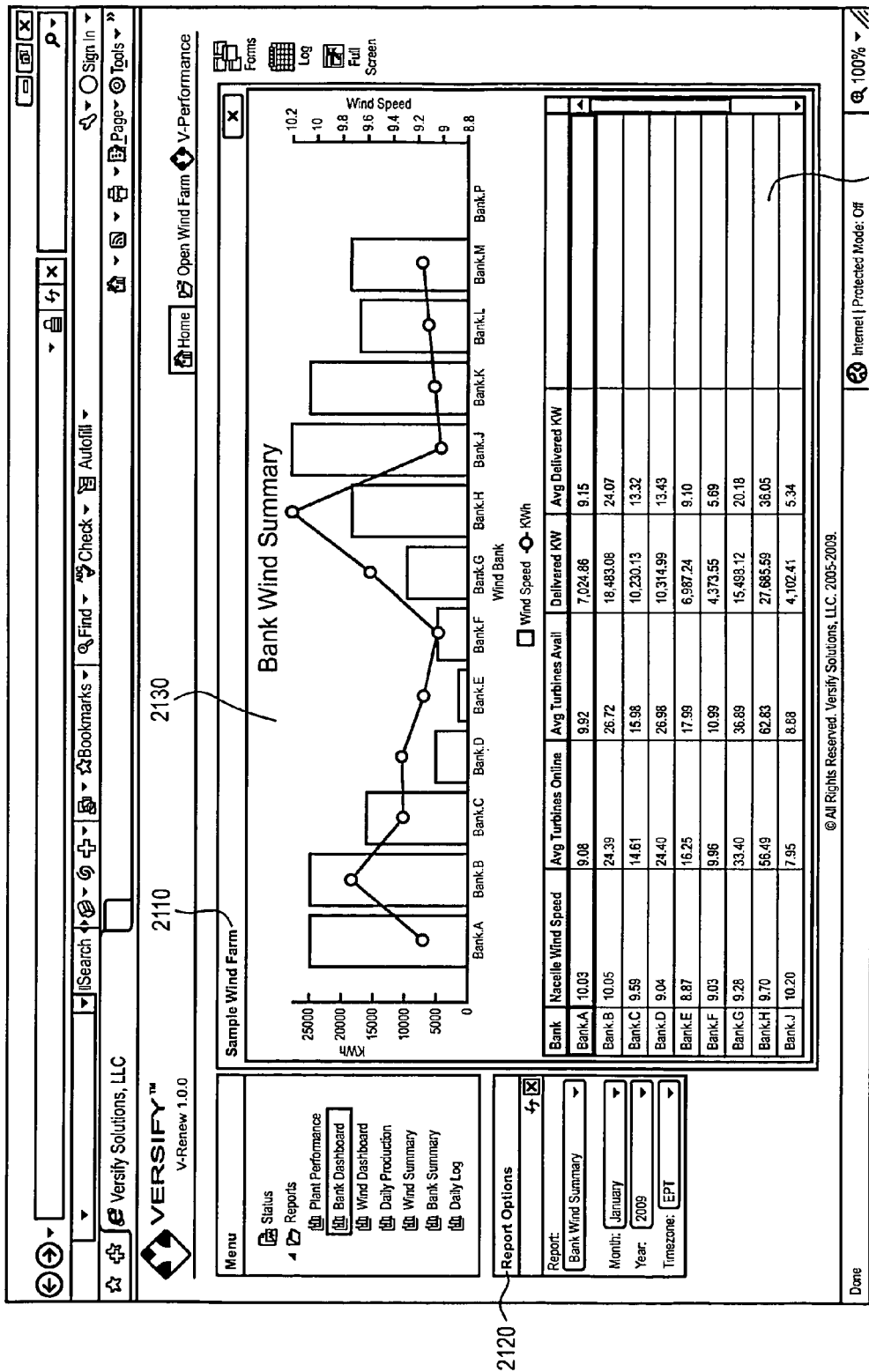
FIG. 21 illustrates an exemplary bank renewable energy generation summary report interface in accordance with the present invention.

FIG. 21 illustrates an exemplary bank renewable energy generation summary report interface 2100 in accordance with the present invention. The interface 2100 may include detailed statistics in numerical table 2140 and graph 2130 format for a renewable energy source plant (e.g., wind farm) report 2110. The statistics may in a graph 2130 include, for example, the KW hours generated for a specific time interval (e.g., an hour, day, week, month, year) at specific renewable energy source metrics (e.g., wind speed). The statistics may in a table 2140 include, for example, a turbine bank (or other set of renewable energy sources) identifier, the wind speed (or other renewable energy source metric), the average renewable energy sources (e.g., turbines) available/online, the delivered KW hours, and the average delivered KW hours. The interface 2100 may further include report options 2120 that may be used to customize the report type (e.g., bank wind summary) and the timeframe (e.g., day, month, year, timezone) during which the graph 2130 and table 2140 data should be analyzed for the report 2110. Other report options may be used without departing from the scope of the present invention.

In addition to the real time monitoring, the system and method of the present invention includes alarm monitoring and tracking of user-defined significant events. For example, the monitoring center 510 of the present invention tracks and logs when a hosted unit comes on-line or goes off-line. The monitoring center 510 tracks alarms against any generation operational parameter that is archived in the time-series data store 518. This is implemented by querying the time-series historical data store 18 for values archived for a selected operational parameter over a set time interval. For example, for a generator unit on-line alarm, the monitoring center 510 queries the historical archive in the data store 518 for a fifteen (15) minute interval and examines breaker status recorded during that timeframe. Any change in the monitored value represents an event, which triggers an alarm. Once examination for the given parameter and time period is complete, the monitored time interval is marked as examined and the alarm as tracked. Future monitoring of the historical archived data in the data store 18 will check subsequent intervals based on what has already been marked as examined. In case of renewable energy power plants, other events, such as meteorological conditions and fluctuations in generated power may be monitored.

The alarming feature is not limited to tracking onioff types or digital state data. Rather, monitored recorded events may also be examined based on numerical thresholds. For example, generation managers may wish to monitor megawatt (MW) levels and create different events based on the number of megawatts produced at a power generation facility. The plant may want to be alerted when the megawatt (MW) level reaches a specific level, such as 100, 250, and 500. Each MW level reached requires a unique action or log entry to be recorded. Such alarms are defined in the monitoring center 10 to initiate tracking and logging. For example, in an exemplary embodiment of the present invention, alarms may be defined by noting the following data points:

Archive historian database;
    Archive historian data point to monitor,
    Compare value (or alarm value);
    Alarm log message to create when value is greater than comparison value;

Alarm log message to create when value is less than comparison value; and

Alarm log message to create when value is equal than comparison value.

To ensure all intervals are examined, examined archived data may be marked by noting:

Archive historian point examined;
Alarm that is tracked;
Examination start time; and
Examination end time.

This serves to baseline subsequent interval checks. It is to be understood that other notations may be made without departing from the scope of the present invention.

The exemplary embodiments of the system and method of the present invention as discussed above provide powerful and efficient monitoring and managing of renewable energy power generation. The monitoring of any number of hosted power generation units is realized by collecting qualitative (e.g., event data, meteorological data) and quantitative (e.g., cost, market data) information from a plurality of disparate data sources, including large number of renewable energy power generation units spread over a large geographical area, converting the disparate data into a common data format, and storing the transformed data to be served up through a communications network, such as the Internet, to a plurality of client devices that may be located anywhere in the world. The various report interfaces in accordance with the present invention, including energy scheduling and dispatch, allow the user to monitor the performance of the hosted power generation units, such as renewable energy power plants, including a comparison of the actual performance of the monitored unit with expected (i.e., budgeted) performance. The system and method of the present invention generates reports using XML configuration files to reduce the time to build and customize any number of reports. The XML configuration files allow developers to simply map data from database stored procedures directly to a report without writing any code to reduce the time required to deliver a report and eliminate the need for any code changes to existing applications.

It will be apparent to those skilled in the art that various modifications and variations can be made in the system and method of the present invention without departing from the spirit or scope of the invention. For example, while the exemplary embodiments above are described as a hosted solution (i.e., the monitoring module 10 is implemented on the hosting monitoring center 510), the system and method of the present invention may be implemented directly at the power generation site (i.e., the monitoring module 10 may be implemented at the power plant 520*a*) without departing from the scope of the invention. Thus, it is intended that the present invention cover the modifications and variations of this invention provided they come within the scope of the appended claims and their equivalents.

What is claimed is:

1. A system, comprising a processor and a non-transitory data storage device that contains instructions when executed by the processor comprising:
    a communications network;
    a plurality of remotely located data sources to provide power data, the power data including quantitative and qualitative data of one or more renewable energy power generation units; and
    a performance monitor in communication with the plurality of remotely located data sources through the communications network, the performance monitor including
        a data store to store the power data, and
        a power manager to manage generation of power from the one or more renewable energy power generation units,
    wherein the quantitative data includes market data and/or operational data, and
    wherein the qualitative data includes event log data.

2. The system of claim 1, wherein the quantitative data includes supervisory control and data acquisition (SCADA) data from a renewable energy power plant and/or market data.

3. The system of claim 1, wherein the quantitative data includes operational cost data of the one or more renewable energy power generation units.

4. The system of claim 1, wherein the qualitative data includes meteorological condition in a geographical region in which one or more renewable energy power generation units are located.

5. The system of claim 4, wherein the meteorological condition is current condition or forecasted condition.

6. The system of claim 4, wherein the power manager forecasts power capability of the one or more renewable power generation units based on the meteorological condition.

7. The system of claim 1, wherein the power manager includes energy scheduling.

8. The system of claim 7, wherein the energy scheduling includes balancing energy source.

9. The system of claim 8, wherein the balancing energy source is an automatic generation control (AGC) source.

10. The system of claim 1, wherein the power manager includes energy dispatch monitoring.

11. The system of claim 10, wherein the energy dispatch monitoring includes a map interface overlaid with forecasting, performance and meteorological indicators of geographical regions in which one or more renewable energy power generation units are located.

12. The system of claim 1, wherein the event log data includes a log of one or more manually-logged renewable energy source events.

13. A method, performed by a processor and a non-transitory data storage device that contains instructions executed by the processor, said method comprising:
    communicating with a plurality of remotely located data sources from a performance monitor via a communications network, the plurality of remotely located data sources providing power data including quantitative and qualitative data of one or more renewable energy power generation units;
    extracting the power data from the plurality of remotely located data sources;
    storing the power data in a data store; and
        monitoring and managing power generated by the one or more renewable energy power generation units based on the power data,
    wherein the quantitative data includes market data and/or operational data, and
    wherein the qualitative data includes event log data.

14. The method of claim 13, wherein the quantitative data includes supervisory control and data acquisition (SCADA) data from a renewable energy power plant and/or market data.

15. The method of claim 13, wherein the quantitative data includes operational cost data of the one or more renewable energy power generation units.

16. The method of claim 13, wherein the qualitative data includes meteorological condition in a geographical region in which one or more renewable energy power generation units are located.

17. The method of claim 16, wherein the meteorological condition is current condition or forecasted condition.

18. The method of claim 16 further including the step of forecasting power capability of the one or more renewable power generation units based on the meteorological condition.

19. The method of claim 13 further including the step of scheduling energy.

20. The method of claim 19, wherein the scheduling of energy includes balancing energy source.

21. The method of claim 20, wherein the balancing energy source is an automatic generation control (AGC) source.

22. The method of claim 13 further includes monitoring energy dispatch.

23. The method of claim 22, wherein the energy dispatch monitoring includes a map interface overlaid with forecasting, performance and meteorological indicators of geographical regions in which one or more renewable energy power generation units are located.

24. The method of claim 13, wherein the event log data includes a log of one or more manually-logged renewable energy source events.

25. A non-transitory computer-readable storage medium, storing one or more programs configured for execution by one or more processors, the one or more programs comprising instructions to:
  communicate with a plurality of remotely located data sources from a performance monitor via a communications network, the plurality of remotely located data sources providing power data including quantitative and qualitative data of one or more renewable energy power generation units;
  extract the power data from the plurality of remotely located data sources;
  store the power data in a data store; and
  monitor and manage power generated by the one or more renewable energy power generation units based on the power data,
  wherein the quantitative data includes market data and/or operational data, and
  wherein the qualitative data includes event log data.

26. The storage medium of claim 25, wherein the event log data includes a log of one or more manually-logged renewable energy source events.

\* \* \* \* \*